US012705876B2

(12) United States Patent
Inoshita et al.

(10) Patent No.: US 12,705,876 B2
(45) Date of Patent: Aug. 11, 2026

(54) MODEL TRAINING APPARATUS, MODEL TRAINING METHOD, AND NON-TRANSITORY COMPUTER-READABLE MEDIUM

(71) Applicant: NEC Corporation, Tokyo (JP)

(72) Inventors: Tetsuo Inoshita, Tokyo (JP); Yuichi Nakatani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 211 days.

(21) Appl. No.: 18/834,016

(22) PCT Filed: Feb. 10, 2022

(86) PCT No.: PCT/JP2022/005395
§ 371 (c)(1),
(2) Date: Jul. 29, 2024

(87) PCT Pub. No.: WO2023/152882
PCT Pub. Date: Aug. 17, 2023

(65) Prior Publication Data

US 2025/0124701 A1 Apr. 17, 2025

(51) Int. Cl.

| | |
|---|---|
| ***G06V 10/82*** | (2022.01) |
| ***G06V 10/77*** | (2022.01) |
| ***G06V 10/98*** | (2022.01) |

(52) U.S. Cl.
CPC .......... *G06V 10/82* (2022.01); *G06V 10/7715* (2022.01); *G06V 10/993* (2022.01)

(58) Field of Classification Search
CPC .. G06V 10/82; G06V 10/7715; G06V 10/993; G06T 7/00
See application file for complete search history.

(56) References Cited

U.S. PATENT DOCUMENTS

| | | | | |
|---|---|---|---|---|
| 8,478,020 B1 * | 7/2013 | Jones | G06V 30/418 382/137 |
| 10,733,733 B1 * | 8/2020 | Nam | G06N 3/088 |

(Continued)

FOREIGN PATENT DOCUMENTS

| | | |
|---|---|---|
| JP | 2018-163444 A | 10/2018 |
| JP | 2019-028876 A | 2/2019 |

(Continued)

OTHER PUBLICATIONS

International Search Report for PCT Application No. PCT/JP2022/005395, mailed on May 10, 2022.

(Continued)

*Primary Examiner* — Cory A Almeida
(74) *Attorney, Agent, or Firm* — Sughrue Mion, PLLC

(57) ABSTRACT

A model training apparatus acquires a first training data set including a first training image representing a scene in a first environment and first class information indicating a class of each of a plurality of image regions included in the first training image. The model training apparatus inputs the first training image to an image conversion model to acquire an output image representing a scene in a second environment, inputs the output image to a discrimination model to acquire discrimination data, and trains the image conversion model using the discrimination data and the first class information. The discrimination data indicates, for each of a plurality of partial regions included in an image input to the discrimination model, whether or not the partial region is a fake image region, and indicates a class of the partial region when the partial region is not a fake image.

18 Claims, 12 Drawing Sheets

(56) References Cited

U.S. PATENT DOCUMENTS

| | | | | |
|---|---|---|---|---|
| 10,928,830 | B1 * | 2/2021 | Tran | B60W 30/12 |
| 11,189,028 | B1 * | 11/2021 | Kearney | A61B 5/1032 |
| 11,276,151 | B2 * | 3/2022 | Kearney | G06T 7/0014 |
| 11,366,985 | B2 * | 6/2022 | Kearney | A61B 5/1032 |
| 12,469,137 | B1 * | 11/2025 | Zhu | G06N 3/08 |
| 2008/0292194 | A1 * | 11/2008 | Schmidt | G06T 7/0012 382/131 |
| 2015/0146963 | A1 * | 5/2015 | Klein | G07D 7/00 382/135 |
| 2016/0267382 | A1 * | 9/2016 | Sullivan | G06T 7/0002 |
| 2018/0173997 | A1 * | 6/2018 | Shen | G06V 10/82 |
| 2018/0204111 | A1 * | 7/2018 | Zadeh | G06N 3/088 |
| 2019/0251401 | A1 * | 8/2019 | Shechtman | G06T 11/00 |
| 2019/0295302 | A1 * | 9/2019 | Fu | G06V 10/82 |
| 2019/0333219 | A1 * | 10/2019 | Xu | G06T 12/30 |
| 2020/0065635 | A1 * | 2/2020 | Lim | G06F 18/2148 |
| 2020/0184200 | A1 * | 6/2020 | Wang | G06N 3/0464 |
| 2020/0184269 | A1 * | 6/2020 | Sakai | G06N 20/00 |
| 2020/0193269 | A1 * | 6/2020 | Park | G06F 17/16 |
| 2020/0242399 | A1 * | 7/2020 | Katoh | G06V 10/82 |
| 2020/0242412 | A1 * | 7/2020 | Katoh | G06V 10/82 |
| 2020/0364864 | A1 * | 11/2020 | Shanbhag | G06T 7/0012 |
| 2020/0394475 | A1 * | 12/2020 | Akhazhanov | G06N 3/084 |
| 2021/0019541 | A1 * | 1/2021 | Wang | G06V 40/172 |
| 2021/0125320 | A1 * | 4/2021 | Kim | G06V 10/764 |
| 2021/0150287 | A1 * | 5/2021 | Baek | H04N 19/136 |
| 2021/0157330 | A1 * | 5/2021 | Tran | G06V 20/56 |
| 2021/0158093 | A1 * | 5/2021 | Kaynig-Fittkau | G06N 3/09 |
| 2021/0158815 | A1 * | 5/2021 | Lee | H04L 67/125 |
| 2021/0192198 | A1 * | 6/2021 | Tulyakov | G06T 7/277 |
| 2021/0201003 | A1 * | 7/2021 | Banerjee | G06V 10/774 |
| 2021/0256707 | A1 * | 8/2021 | Brown | G06N 3/084 |
| 2021/0358115 | A1 * | 11/2021 | Hever | G06N 3/088 |
| 2021/0358164 | A1 * | 11/2021 | Liu | G06T 11/60 |
| 2022/0036066 | A1 * | 2/2022 | Cho | G06T 11/10 |
| 2022/0067519 | A1 * | 3/2022 | Mishra | G06N 3/0455 |
| 2022/0101104 | A1 * | 3/2022 | Chai | G06N 3/045 |
| 2022/0180622 | A1 * | 6/2022 | Zhang | G06T 7/194 |
| 2022/0254022 | A1 * | 8/2022 | Karki | G06T 7/136 |
| 2022/0262150 | A1 * | 8/2022 | Pic | G06V 30/245 |
| 2022/0284584 | A1 * | 9/2022 | Lee | G06T 7/0012 |
| 2022/0301106 | A1 * | 9/2022 | Liu | G06N 3/09 |
| 2023/0061517 | A1 * | 3/2023 | Yang | G06V 10/774 |
| 2023/0076868 | A1 * | 3/2023 | Olender | G06T 7/0012 |
| 2023/0169632 | A1 * | 6/2023 | Kulkarni | G06T 5/50 382/276 |
| 2024/0242338 | A1 * | 7/2024 | Lee | G06T 7/0012 |
| 2024/0420316 | A1 * | 12/2024 | Rajanna | G06T 7/0012 |

FOREIGN PATENT DOCUMENTS

| | | | |
|---|---|---|---|
| JP | 2020-014799 | A | 1/2020 |
| JP | 2020-095364 | A | 6/2020 |

OTHER PUBLICATIONS

Taesung Park, Alexei A. Efros, Richard Zhang and Jun-Yan Zhu, “Contrastive Learning for Unpaired Image-to-Image Translation”, [online], Aug. 20, 2020, [retrieved on Jan. 31, 2022], retrieved from <URL: https://arxiv.org/pdf/2007.15651.pdf>.

Taesung Park, Ming-Yu Liu, Ting-Chun Wang and Jun-Yan Zhu, “Semantic Image Synthesis with Spatially-Adaptive Normalization”, Nov. 5, 2019, [retrieved on Jan. 31, 2022], retrieved from <URL: https://arxiv.org/pdf/1903.07291.pdf>.

Vadim Sushko, Edgar Schonfeld, Dan Zhang, Juergen Gall, Bernt Schiele and Anna Khoreva, “You Only Need Adversarial Supervision for Semantic Image Synthesis”, [online], Mar. 19, 2021, [retrieved on Jan. 31, 2022], retrieved from <URL: https://arxiv.org/pdf/2012.04781.pdf>.

Jun-Yan Zhu, Taesung Park, Phillip Isola and Alexei A. Efros, “Unpaired Image-to-Image Translation using Cycle-Consistent Adversarial Networks”, Aug. 24, 2020, [retrieved on Jan. 31, 2022], retrieved from <URL: https://arxiv.org/pdf/1703.10593.pdf>.

Mansourifar, Hadi et al., “Virtual Big Data for GAN Based Data Augmentation”, 2019 IEEE International Conference on Big Data (Big Data), Dec. 12, 2019.

JP Office Communication for JP Application No. 2023-579963, mailed on Apr. 15, 2025 with English Translation.

Masahito Hoshi et al., “Comparison of GANs for Data Augmentation Performance in Classification”, FIT2020, 19th Forum on Information Technology, Lecture collected papers, The 3rd separate volume, Japan, The Institute of Electronics, Information and Communication Engineers, The Institute of Information Processing Society of Japan, Aug. 18, 2020, pp. 149-150.

Yuta Yoshitake et al., “Attribute edit of a face image”, Information Processing Society of Japan Technical Report, Natural language processing (NL), Japan, Information Processing Society of Japan, May 13, 2021, pp. 1-8.

Hiroto Abe et al., “Data augmentation using conditional BEGAN”, The Papers of Technical Meeting on “Perception Information”, IEE Japan, The Institute of Electrical Engineers of Japan, Dec. 25, 2020, pp. 35-37.

* cited by examiner

DETECTION ACCURACY OF CAR DURING NIGHTTIME IS LOW

IMAGE OF CAR DURING DAYTIME OBTAINED FROM CAMERA

100

IMAGE CONVERSION MODEL

TRAINING

DETECTION MODEL

IMAGE OF CAR DURING NIGHTTIME OBTAINED FROM CAMERA

IMAGE OF CAR DURING NIGHTTIME GENERATED THROUGH DATA AUGMENTATION

BOTH CARS DURING DAYTIME AND NIGHTTIME CAN BE DETECTED WITH HIGH ACCURACY

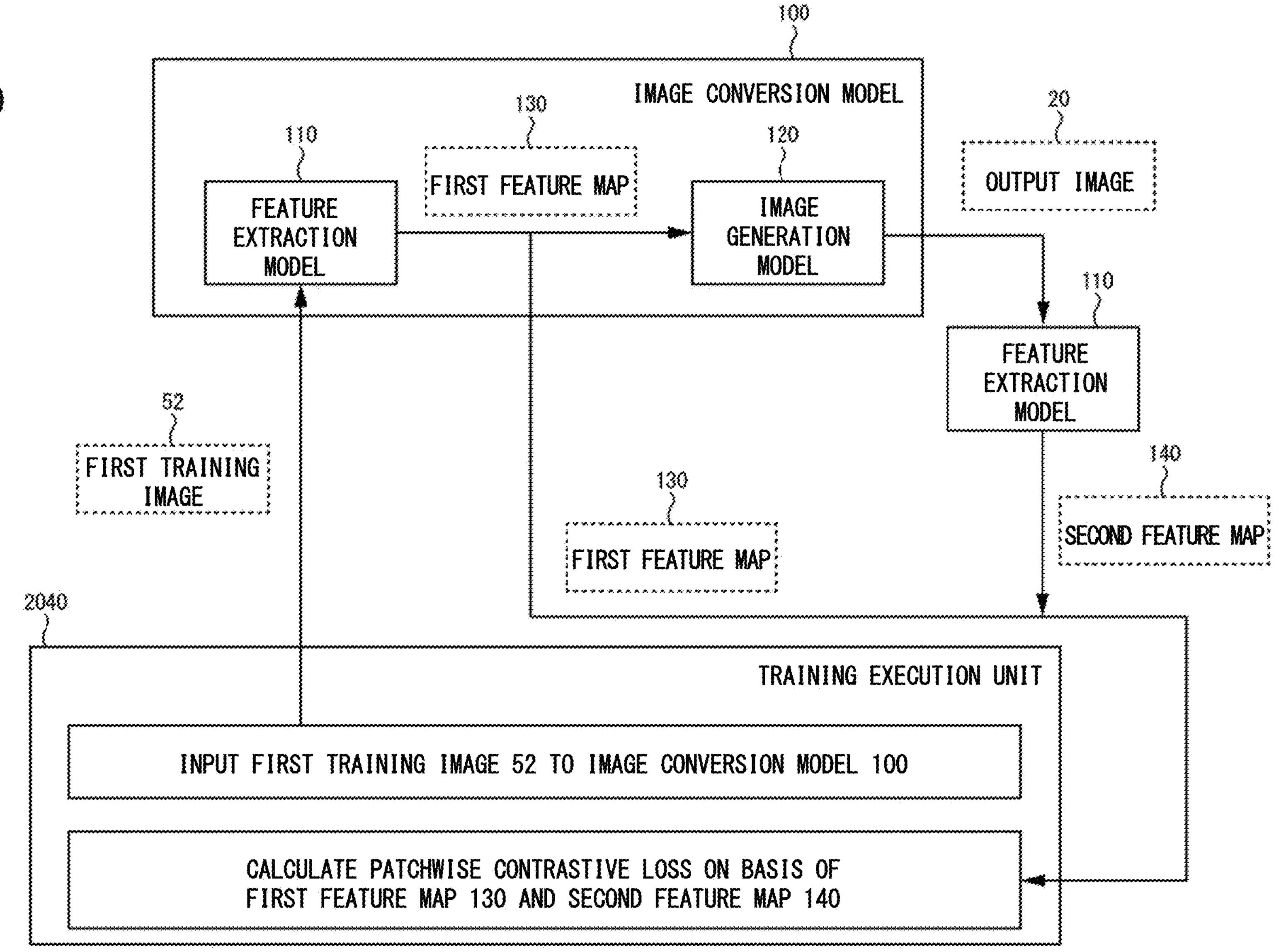

Fig. 10
100
IMAGE CONVERSION MODEL
110
FEATURE EXTRACTION MODEL
130
FIRST FEATURE MAP
120
IMAGE GENERATION MODEL
20
OUTPUT IMAGE
110
FEATURE EXTRACTION MODEL
52
FIRST TRAINING IMAGE
130
FIRST FEATURE MAP
140
SECOND FEATURE MAP
2040
TRAINING EXECUTION UNIT
INPUT FIRST TRAINING IMAGE 52 TO IMAGE CONVERSION MODEL 100
CALCULATE PATCHWISE CONTRASTIVE LOSS ON BASIS OF FIRST FEATURE MAP 130 AND SECOND FEATURE MAP 140

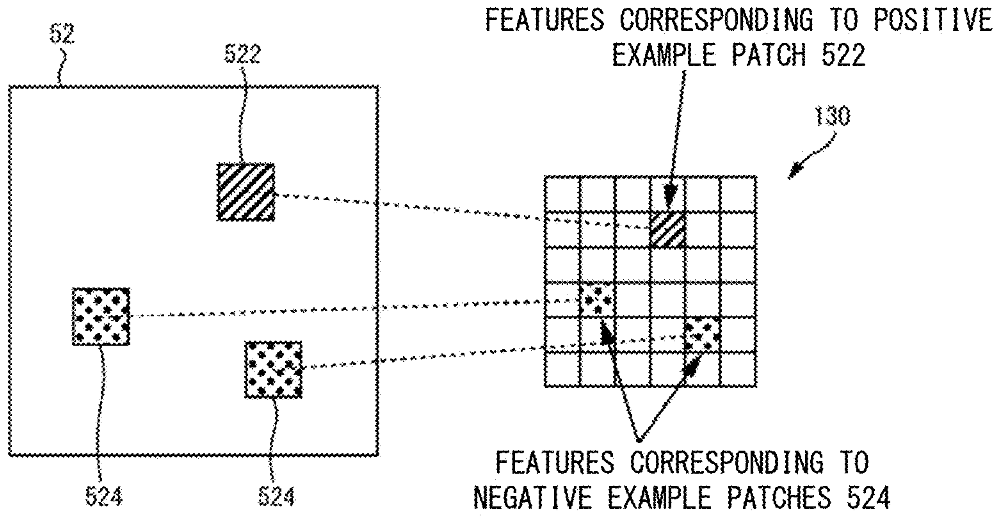
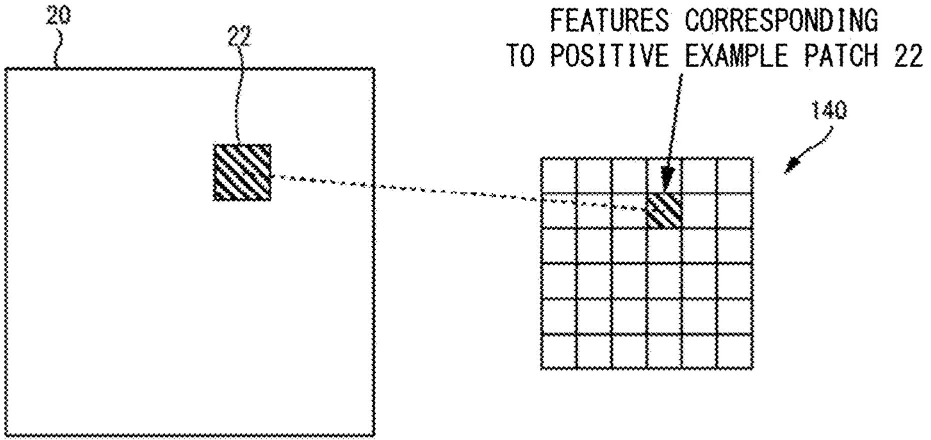
Fig. 11

MODEL TRAINING APPARATUS, MODEL TRAINING METHOD, AND NON-TRANSITORY COMPUTER-READABLE MEDIUM

This application is a National Stage Entry of PCT/JP2022/005395 filed on Feb. 10, 2022, the contents of all of which are incorporated herein by reference, in their entirety.

TECHNICAL FIELD

The present disclosure relates to a technique for training a model that performs image conversion.

BACKGROUND ART

A model for generating another image based on an input image, that is, a model for converting an image has been developed. For example, Non Patent Literature 1 discloses a model for converting an input image into an image of another class, such as converting an image of a horse into an image of a zebra.

CITATION LIST

Non Patent Literature

Non Patent Literature 1: Taesung Park, Alexei A. Efros, Richard Zhang, and Jun-Yan Zhu, "Contrastive Learning for Unpaired Image-to-Image Translation", [online], Aug. 20, 2020, arXiv, [retrieved on Jan. 31, 2022], Internet <URL: https://arxiv.org/pdf/2007/15651.pdf>

Non Patent Literature 2: Taesung Park, Ming-Yu Liu, Ting-Chun Wang, and Jun-Yan Zhu, "Semantic Image Synthesis with Spatially-Adaptive Normalization", Nov. 5, 2019, arXiv, [retrieved on Jan. 31, 2022], Internet <URL: https://arxiv.org/pdf/1903.07291.pdf>

Non Patent Literature 3: Vadim Sushko, Edgar Schonfeld, Dan Zhang, Juergen Gall, Bernt Schiele, and Anna Khoreva, "You Only Need Adversarial Supervision for Semantic Image Synthesis", [online], Mar. 19, 2021, arXiv, [retrieved on Jan. 31, 2022], Internet <URL: https://arxiv.org/pdf/2012.04781.pdf>

Non Patent Literature 4: Jun-Yan Zhu, Taesung Park, Phillip Isola, and *Alexei* A. Efros, "Unpaired Image-to-Image Translation using Cycle-Consistent Adversarial Networks", Aug. 24, 2020, arXiv, [retrieved on Jan. 31, 2022], Internet <URL: https://arxiv.org/pdf/1703.10593.pdf>

SUMMARY OF INVENTION

Technical Problem

In Non Patent Literature 1, a class of an object is converted through image conversion. The present disclosure has been made in view of the above problem, and an objective of the present disclosure is to provide a new technique for training models to convert images.

Solution to Problem

A model training apparatus according to the present disclosure includes: acquisition means for acquiring a first training data set including a first training image representing a scene in a first environment and first class information indicating a class of each of a plurality of image regions included in the first training image; and training execution means for executing training of an image conversion model that outputs an image representing a scene in a second environment in response to an input of the image representing the scene in the first environment using the first training data set.

The training execution means inputs the first training image to the image conversion model, inputs a first output image output from the image conversion model to a discrimination model, calculates a first loss using the discrimination data output from the discrimination model and the first class information, and updates a parameter of the image conversion model using the first loss.

The discrimination data indicates, for each of a plurality of partial regions included in the image input to the discrimination model, whether or not the partial region is a fake image region, and indicates a class of the partial region when the partial region is not a fake image.

A model training method according to the present disclosure is executed by a computer. The model training method includes: an acquisition step of acquiring a first training data set including a first training image representing a scene in a first environment and first class information indicating a class of each of a plurality of image regions included in the first training image; and a training execution step of executing training of an image conversion model that outputs an image representing a scene in a second environment in response to an input of the image representing the scene in the first environment using the first training data set.

In the training execution step, inputting the first training image to the image conversion model, inputting a first output image output from the image conversion model to a discrimination model, calculating a first loss using the discrimination data output from the discrimination model and the first class information, and updating a parameter of the image conversion model using the first loss.

The discrimination data indicates, for each of a plurality of partial regions included in the image input to the discrimination model, whether or not the partial region is a fake image region, and indicates a class of the partial region when the partial region is not a fake image.

A computer-readable medium according to the present disclosure stores a program that causes a computer to execute the model training method according to the present disclosure.

Advantageous Effects of Invention

According to the present disclosure, a new technique for training models to convert images is provided.

BRIEF DESCRIPTION OF DRAWINGS

FIG. 10 is a diagram illustrating a positive example patch and a negative example patch.

FIG. 11 is a diagram illustrating a method of calculating a patchwise contrastive loss.

EXAMPLE EMBODIMENT

Figure 1:
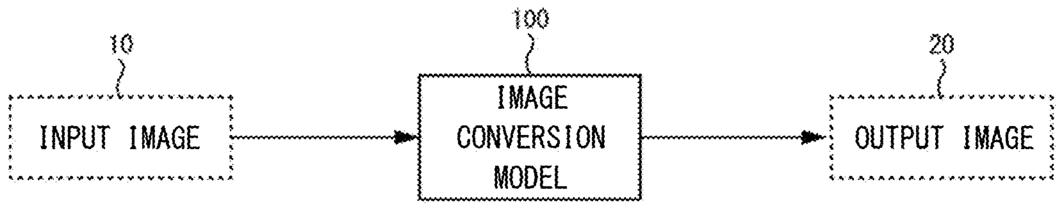
FIG. 1 is a diagram illustrating an overview of an image conversion model trained by a model training apparatus.

Hereinafter, example embodiments of the present disclosure will be described in detail with reference to the drawings. In the drawings, the same or corresponding elements are denoted by the same reference numerals, and repeated description is omitted as necessary for clarity of description. In addition, unless otherwise described, predetermined values such as predetermined values and threshold values are stored in advance in a storage device or the like accessible from a device using the values. Furthermore, unless otherwise described, the storage unit includes one or more storage devices of any number.

Overview

FIG. 1 is a diagram illustrating an overview of an image conversion model trained by a model training apparatus according to the present example embodiment. The image conversion model 100 outputs an output image 20 in response to the input of an input image 10. The input image 10 is an image that is input to the image conversion model 100. The output image 20 is an image that is output from the image conversion model 100. For example, the image conversion model 100 is implemented as an arbitrary machine learning model (for example, a neural network).

The image conversion model 100 is trained so that it performs a process of "when an image representing a scene in a first environment is input as the input image 10, outputting an image representing the scene in a second environment as the output image 20, wherein the second environment is different from the first environment". As a result, the image conversion model 100 can artificially generate, from an image of a scene captured in a specific environment, an image of the scene captured in a different environment.

For example, it is assumed that the first environment is daytime and the second environment is nighttime. It is also assumed that the input image 10 is an image obtained by capturing a specific road by a camera. Nighttime roads are different from daytime roads in that they are generally darker, various lights such as vehicle lights and street lights are on, and the places illuminated by the lights are brighter than other places. The image conversion model 100 generates, from an image of a daytime road, an image of a nighttime road so as to artificially reproduce the features of that road in the nighttime. As a result, for example, data augmentation can be achieved as described later.

Note that the environment is not limited to a time zone such as daytime or nighttime. For example, another example of the environment includes an environment related to weather. For example, it is assumed that the first environment is sunny and the second environment is rainy. In this case, the image conversion model 100 generates, from the input image 10 representing a scene in sunny weather, the output image 20 representing the scene in rainy weather. Instead of rain, other weather such as snow may be employed.

Furthermore, when the output image 20 is generated from the input image 10, the image conversion model 100 is trained so as to convert the environment from the first environment to the second environment but not to convert the class of each image region. The class of the image region is represented by, for example, the type of the object included in the image region. Therefore, conversion from the input image 10 to the output image 20 is performed such that an image region representing a car in the input image 10 also represents the car in the output image 20. By training the image conversion model 100 in this manner, it is possible to prevent a predetermined type of object such as a car from being lost while the environment is converted when the conversion from the input image 10 to the output image 20 is performed. Note that importance of preventing the loss of the object will be described later.

Figure 2:
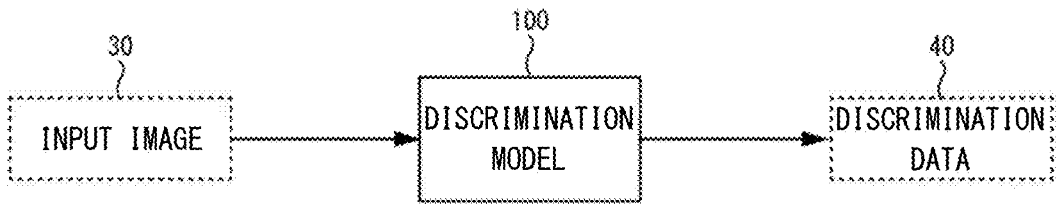
FIG. 2 is a diagram illustrating an overview of a discrimination model.

The training of the image conversion model 100 is performed using a discrimination model. FIG. 2 is a diagram illustrating an overview of a discrimination model 200. For example, the discrimination model 200 is implemented as an arbitrary machine learning model (for example, a neural network).

The discrimination model 200 identifies, for each of a plurality of image regions included in an input image 30, whether the image region is a real image region representing a scene in the second environment. Here, the real image region means an image region that is not an image region generated by the image conversion model 100 (that is, the image region is not a pseudo-generated image region). In addition, the discrimination model 200 identifies a class of the image region for the real image region. Hereinafter, the image generated by the image conversion model 100 (that is, a pseudo image) and the image that is not generated by the image conversion model 100 will be referred to as a "fake image" and a "real image", respectively. Also, an image region that is not a real image region will be referred to as a "fake image region".

Discrimination data 40 represents a result of the discrimination by the discrimination model 200. For example, the discrimination data 40 indicates, for each of a plurality of the image regions included in the input image 10, a probability of being a real image region belonging to each class and a probability being a fake image region. For example, it is assumed that n types of classes C1 to Cn are prepared. In this case, the discrimination data 40 indicates an (N+1)-dimensional vector (hereinafter, a score vector) for each of the plurality of image regions included in the input image. The score vector indicates a probability that the corresponding image region is a real image region belonging to each of the classes C1 to CN and a probability that the corresponding image region is a fake image region. For example, the score vector indicates a probability that the corresponding image region is a real image region belonging to a class Ci ($1<=i<=n$) as an i-th element and indicates a probability that the corresponding image region is a fake image region as an (N+1)-th element.

The image region to be identified by the discrimination model 200 may be one pixel or a region configured of a plurality of pixels. In the former case, the discrimination model 200 performs true-or-fake discrimination and class identification for each pixel of the input image 10. On the other hand, in the latter case, the discrimination model 200 divides the input image 10 into a plurality of image regions with a predetermined size and performs true-or-fake discrimination and class identification for each image region as a target, for example.

Figure 3:
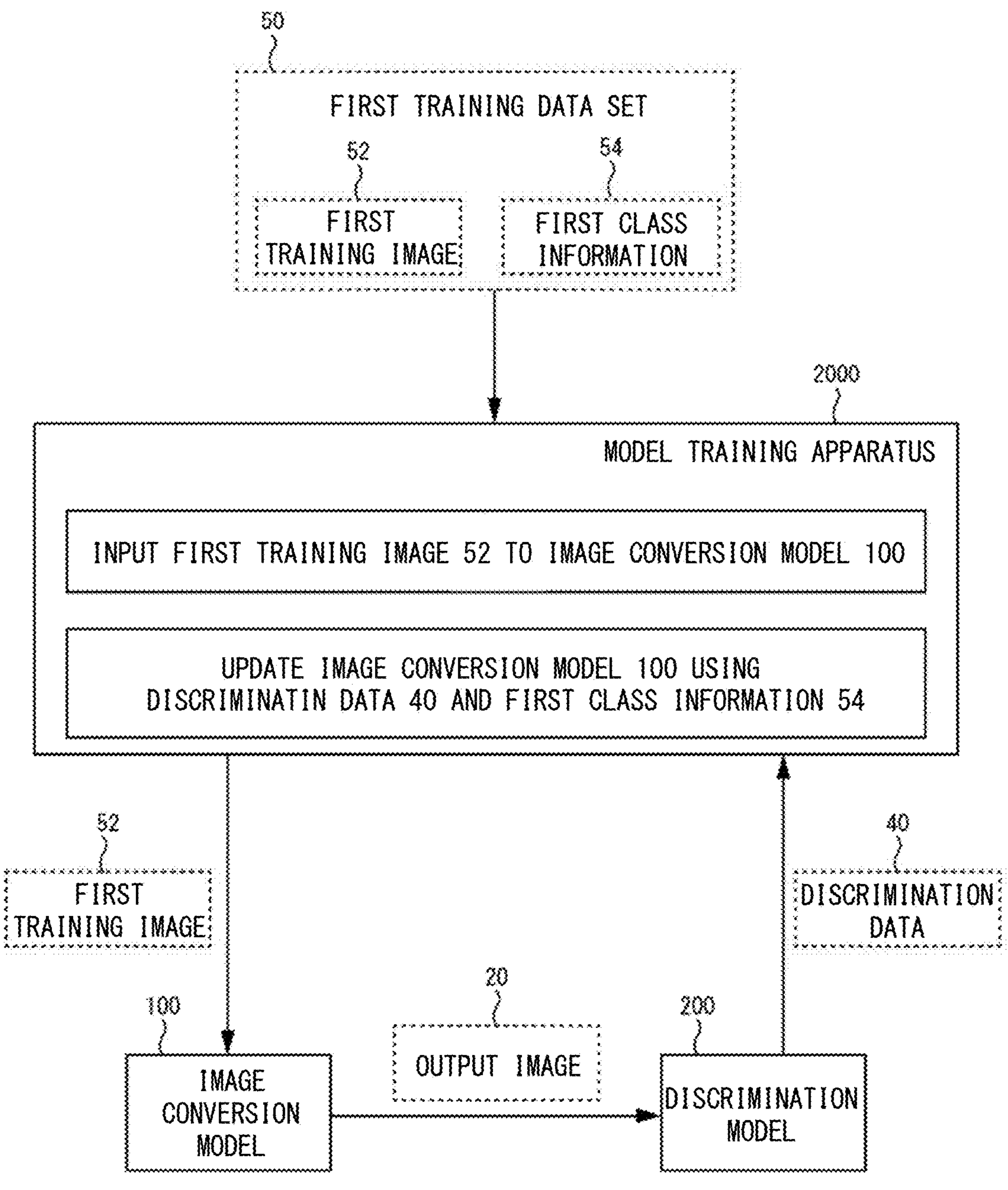
FIG. 3 is a diagram illustrating an overview of a model training apparatus.

An overview of operations of a model training apparatus 2000 according to the present example embodiment will be described on the premise of the configurations of the image conversion model 100 and the discrimination model 200 described above. FIG. 3 is a diagram illustrating an overview of the model training apparatus 2000 according to the present example embodiment. Here, FIG. 3 is a diagram for facilitating understanding of the overview of the model training apparatus 2000, and the operations of the model training apparatus 2000 are not limited to those illustrated in FIG. 1.

The model training apparatus 2000 acquires a first training data set 50. The first training data set 50 includes a first training image 52 and first class information 54. The first training image 52 is an image representing a scene in the first environment. The first class information 54 indicates a class of each of the plurality of image regions included in the first training image 52.

The model training apparatus 2000 obtains the output image 20 from the image conversion model 100 by inputting the first training image 52 as the input image 10 to the image conversion model 100. Furthermore, the discrimination model 200 inputs the output image 20 to the discrimination model 200. As a result, the model training apparatus 2000 obtains the discrimination data 40 representing a discrimination result for each image region included in the output image 20.

Here, it is desirable that the image conversion model 100 perform environment conversion but not perform class conversion as described above. Therefore, it is preferable to train the image conversion model 100 such that each image region of the output image 20 is identified by the discrimination model 200 as "a real image region belonging to the same class as the image region of the corresponding input image 10". In other words, it is preferable to train the image conversion model 100 such that the class of each image region identified by the discrimination data 40 matches the class of each image region indicated by the first class information 54.

Thus, the model training apparatus 2000 calculates a first loss representing a magnitude of a difference between the discrimination data 40 and the first class information 54, and trains the image conversion model 100 so as to reduce the first loss. Specifically, the model training apparatus 2000 updates a trainable parameter (each weight of a neural network, for example) included in the image conversion model 100 so as to reduce the first loss.

Note that the class of the image region identified by the discrimination data 40 is, for example, a class corresponding to an element having a maximum value in the score vector described above. Note that in a case where an element having the maximum value in the score vector corresponds to a fake image region, the score vector indicates that the corresponding image region is a fake image region.

Example of Advantageous Effect

In the method of Non Patent Literature 1, class conversion such as converting a horse image into a zebra image is performed on the entire image. Therefore, according to the method of Non Patent Literature 1, it is not possible to perform image conversion of maintaining the class (the type of the object, for example) of each image region while converting the environment of the scene represented by the entire image. As an example of such image conversion, image conversion of converting an image of a road in daytime in which a car is traveling into an image at nighttime in which the car is traveling is conceivable. In this image conversion, it is necessary to convert the environment of the scene represented by the entire image from daytime to nighttime, and it is also necessary for the image region representing the car in the image before the conversion to represent the car in the image region after the conversion as well.

In this regard, the model training apparatus 2000 inputs the output image 20 obtained from the image conversion model 100 to the discrimination model 200 and trains the image conversion model 100 using the discrimination data 40 obtained from the discrimination model 200 and the first class information 54. It is thus possible to obtain the image conversion model 100 having a function of "performing conversion from a scene in a first environment to a scene in a second environment while maintaining a class of each image region".

Hereinafter, the model training apparatus 2000 of the present example embodiment will be described in more detail.

<Example of Functional Configuration>

Figure 4:
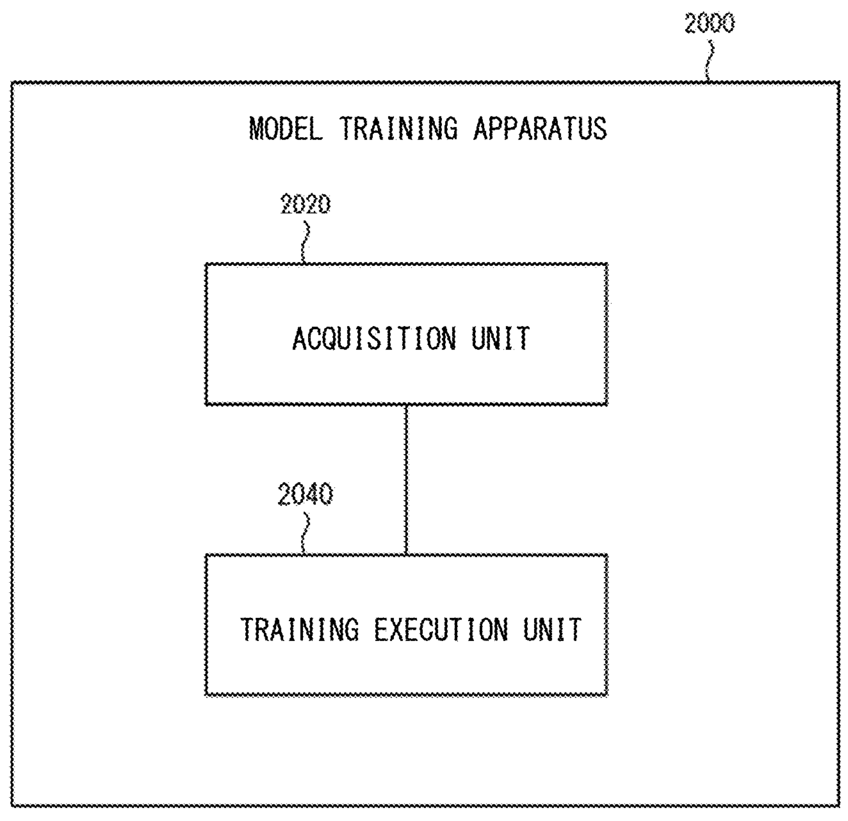
FIG. 4 is a block diagram illustrating a functional configuration of a model training apparatus.

FIG. 4 is a block diagram illustrating a functional configuration of the model training apparatus 2000 according to the present example embodiment. The model training apparatus 2000 includes an acquisition unit 2020 and a training execution unit 2040. The acquisition unit 2020 acquires the first training data set 50. The training execution unit 2040 trains the image conversion model 100 using the first training data set 50. Specifically, the training execution unit 2040 inputs the first training image 52 to the image conversion model 100 and obtains the output image 20 from the image conversion model 100. Furthermore, the training execution unit 2040 inputs the output image 20 to the discrimination model 200 and obtains the discrimination data 40 from the discrimination model 200. Then, the training execution unit 2040 calculates the first loss representing the magnitude of the difference between the discrimination data 40 and the first class information 54 and updates the image conversion model 100 using the first loss.

<Example of Hardware Configuration>

Each functional component of the model training apparatus 2000 may be realized by hardware (for example, a hard-wired electronic circuit or the like) that realizes each functional configuration unit, or may be realized by a combination of hardware and software (for example, a combination of an electronic circuit and a program that controls the electronic circuit or the like). Hereinafter, a case where each functional component of the model training apparatus 2000 is realized by a combination of hardware and software will be further described.

Figure 5:
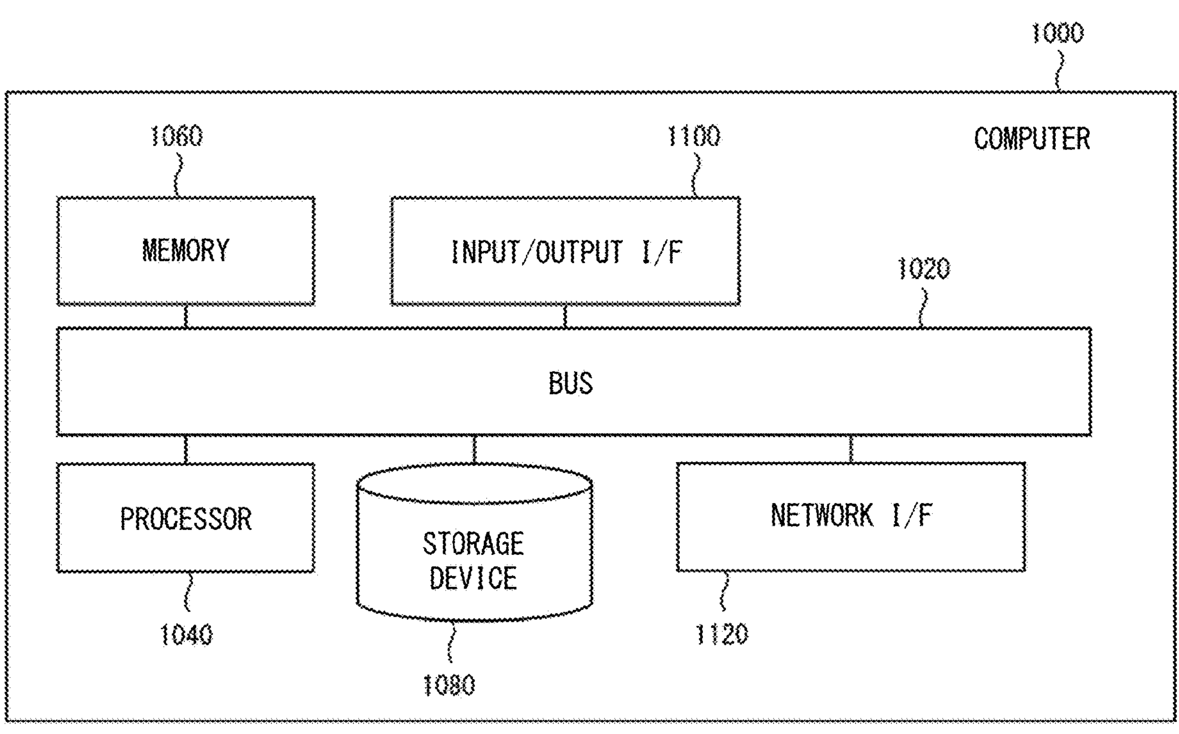
FIG. 5 is a block diagram illustrating a hardware configuration of a computer that realizes a model training apparatus.

FIG. 5 is a block diagram illustrating a hardware configuration of a computer 1000 that realizes the model training apparatus 2000. The computer 1000 is any computer. For example, the computer 1000 is a stationary computer such as a personal computer (PC) or a server machine. In another example, the computer 1000 is a portable computer such as a smartphone or a tablet terminal. The computer 1000 may be a special purpose computer designed to realize the model training apparatus 2000 or may be a general-purpose computer.

For example, each function of the model training apparatus 2000 is realized in the computer 1000 by installing a predetermined application in the computer 1000. The above-described application is configured by a program for realizing the functional components of the model training apparatus 2000. Note that the method of acquiring the program is arbitrary. For example, the program can be acquired from a storage medium (a DVD disk, a USB memory, or the like) in which the program is stored. The program can also be acquired, for example, by downloading the program from a server device that manages the storage device in which the program is stored.

The computer 1000 includes a bus 1020, a processor 1040, a memory 1060, a storage device 1080, an input/output interface 1100, and a network interface 1120. The bus 1020 is a data transmission path for the processor 1040, the memory 1060, the storage device 1080, the input/output interface 1100, and the network interface 1120 to transmit and receive data to and from each other. However, a method of connecting the processor 1040 and the like to each other is not limited to the bus connection.

The processor 1040 is any of various processors such as a central processing unit (CPU), a graphics processing unit (GPU), or a field-programmable gate array (FPGA). The memory 1060 is a primary storage device realized using a random access memory (RAM) or the like. The storage device 1080 is an auxiliary storage device realized using a hard disk, a solid state drive (SSD), a memory card, a read only memory (ROM), or the like.

The input/output interface 1100 is an interface for connecting the computer 1000 and an input/output device. For example, an input device such as a keyboard and an output device such as a display device are connected to the input/output interface 1100.

The network interface 1120 is an interface for connecting the computer 1000 to a network. The network may be a local area network (LAN) or a wide area network (WAN).

The storage device 1080 stores a program (a program for realizing the above-described application) for realizing each functional component of the model training apparatus 2000. The processor 1040 loads the program onto the memory 1060 and executes the program to realize each functional component of the model training apparatus 2000.

The model training apparatus 2000 may be realized by one computer 1000 or may be realized by a plurality of computers 1000. In the latter case, the configurations of the computers 1000 do not need to be the same and can be different from each other.

<Flow of Processes>

Figure 6:
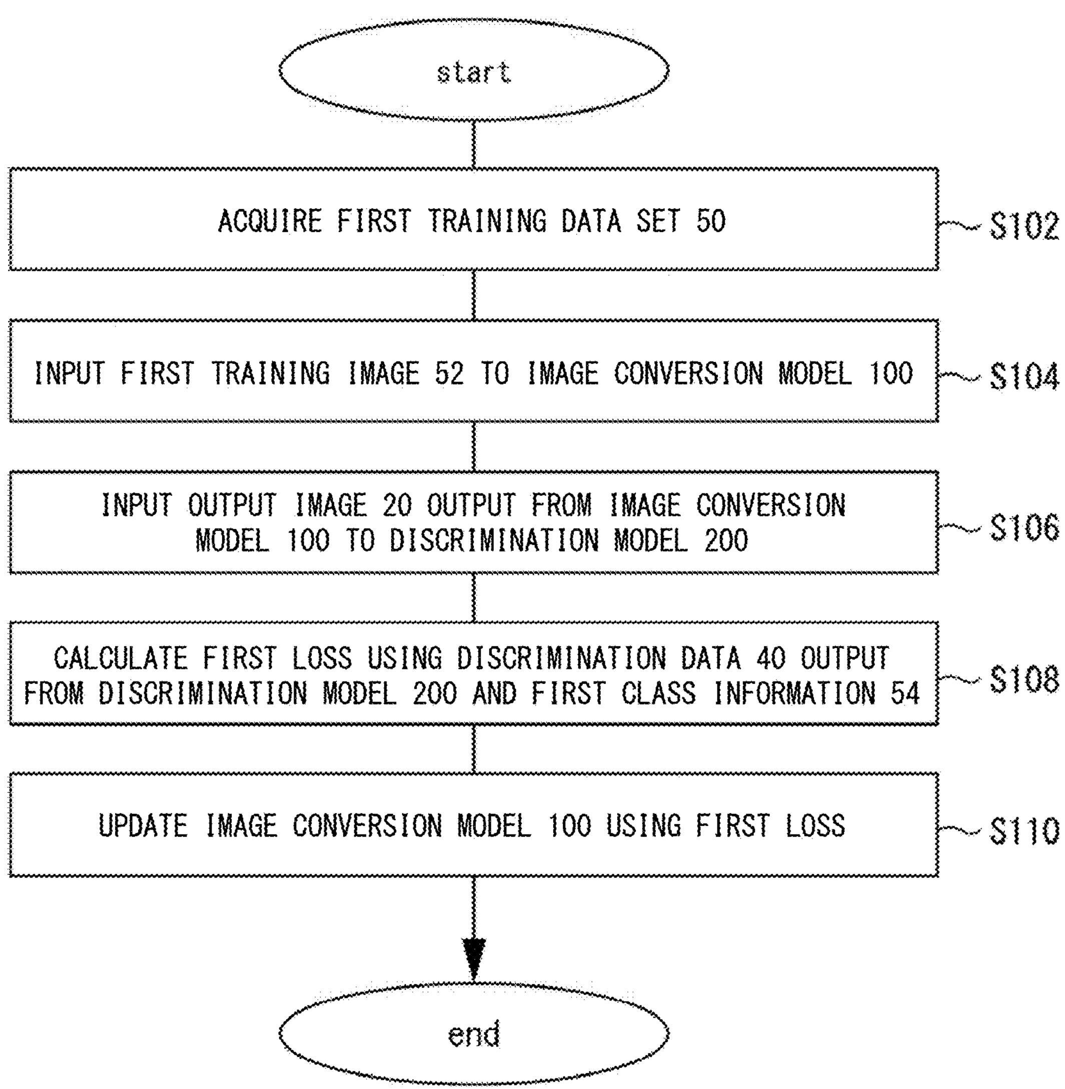
FIG. 6 is a flowchart illustrating a flow of processes executed by a model training apparatus.

FIG. 6 is a flowchart illustrating a flow of processes executed by the model training apparatus 2000 according to the present example embodiment. The acquisition unit 2020 acquires the first training data set 50 (S102). The training execution unit 2040 inputs the first training image 52 to the image conversion model 100 (S104). The training execution unit 2040 inputs the output image 20 output from the image conversion model 100 to the discrimination model 200 (S106). The training execution unit 2040 calculates the first loss based on the magnitude of the difference between the discrimination data 40 output from the discrimination model 200 and the first class information 54 (S108). The training execution unit 2040 updates the image conversion model 100 using the first loss (S110).

Note that the model training apparatus 2000 acquires a plurality of first training data sets 50 and trains the image conversion model 100 by repeatedly updating the image conversion model 100 using the plurality of first training data sets 50.

<Example Usage of Image Conversion Model 100>

In order to facilitate understanding of the usefulness of the model training apparatus 2000, a usage scenario of the image conversion model 100 is illustrated. The usage scenario described here is an example, and the use scene of the model training apparatus 2000 is not limited to the example described below.

As a usage scenario, a case is assumed in which video data obtained from a monitoring camera that captures a road is used for monitoring vehicles. The monitoring of the vehicles is performed by detecting the vehicles from each video frame of the video data using a monitoring apparatus. The monitoring apparatus has a detection model that is pre-trained to detect vehicles from images.

Here, the appearance of an object in an image (image features of the object) can vary depending on the environment in which the objects are captured. For example, vehicles captured in the daytime look different from the vehicles captured in the nighttime. In addition, vehicles captured in sunny weather looks different from the vehicles captured in rainy weather.

The detection model used for monitoring vehicles is preferably robust to such changes in the environment. That is, the detection model needs to be trained to detect vehicles from each video frame regardless of the time zone or weather. For this purpose, the detection model needs to be trained using images of roads captured in various environments as training images.

In this regard, the ease of obtaining training images can vary from environment to environment. For example, since there are fewer vehicles in the nighttime than in the daytime, fewer number of images on which vehicles on nighttime roads are captured are available from monitoring cameras than images on which vehicles on daytime roads are captured. In addition, in a place where it is often sunny, fewer number of images on which vehicles on non-sunny (e.g., rainy or snowy) roads are captured are available from monitoring cameras than images on which vehicles on sunny roads are captured. Due to the fact that the number of available images thus varies from environment to environment, if the detection model is trained using only the images available from monitoring cameras, the detection accuracy of vehicles in environments such as nighttime or rainy weather become low.

Figure 7:
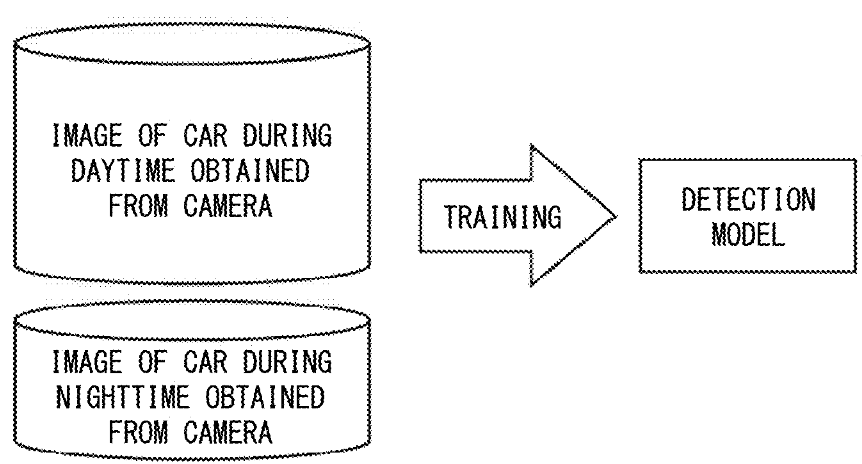
FIG. 7 is a diagram illustrating an effect of data augmentation using an image conversion model.

Thus, an image in an environment that is not readily obtained is generated in a pseudo manner by performing data augmentation using an image in an environment that is readily obtained using the image conversion model 100 trained by the model training apparatus 2000. For example, it is assumed that the image conversion model 100 has been pre-trained by the model training apparatus 2000 so that the image of the vehicles on the nighttime road is output as the output image 20 in response to an image of vehicles on a daytime road being input as the input image 10. FIG. 7 is a diagram illustrating an effect of data augmentation using the image conversion model 100.

The upper part of FIG. 7 illustrates a case where the detection model is trained using only the images obtained from the monitoring cameras, without data augmentation by the image conversion model 100. In this case, since the number of training images on which the vehicles in the nighttime are captured is insufficient, the accuracy of the detection of vehicles in the nighttime becomes lower.

On the other hand, the lower part of FIG. 7 illustrates a case where data augmentation is performed by the image conversion model 100. The user inputs the image of vehicles on the daytime road obtained from the monitoring camera to the image conversion model 100, thereby obtaining an image that simulates the vehicles on the nighttime road. By doing so, the image of the vehicles on the nighttime road can be obtained in the equivalent number to the image of the vehicles on the daytime road. In this way, by training the detection model using the image obtained using the image conversion model 100 as the training image, a detection model that can accurately detect vehicles in the nighttime can be generated. That is, a detection model robust to changes in the environment can be generated.

Here, information indicating in which part of a training image the car is located is also needed in addition to the training image in order to train the detection model. The information can be handled as class information indicating, for each image region included in the training image, which of two types of classes (namely, cars and other things) the image region belongs to. However, in a case where the detection model can detect not only a car but also other types of objects (for example, a person, a road, and the like), these types are also indicated by the class information.

Here, if it is necessary to manually generate the class information for the image generated using the image conversion model 100, it takes a long time to perform data augmentation (generation of training data sets) using the image conversion model 100. In this regard, if the class of each image region of the input image 10 matches the class of each image region of the output image 20, the class information of the input image 10 can also be used as it is as the class information of the output image 20. Therefore, the time required for data augmentation using the image conversion model 100 can be greatly reduced. Thus, the image conversion model 100 is trained to perform environment conversion but not to perform class conversion as described above.

<As to Class>

The type of the class of the image region handled by the model training apparatus 2000 can be arbitrarily set in accordance with features and the like of the scene represented by the image handled by the image conversion model 100. For example, the image region is classified into two classes: predetermined objects that can be included in the images handled by the image conversion model 100; and other things. In a case where the predetermined object is a car, for example, the first class information 54 indicates a class "car" in an image region representing a car and indicates a class "non-car" in an image region representing an object other than a car.

As the predetermined object, a plurality of types of objects may be handled. For example, it is conceivable to classify cars more finely. Specifically, it is conceivable to provide classes such as "passenger car", "bus", "truck", "motorcycle", and "bicycle". In addition, classes other than cars such as "road", "building", and "person", for example, may be provided. Note that in a case where the class "road" is provided, roads may be further classified in accordance with car traveling directions.

<Configuration of Image Conversion Model 100>

Figure 8:
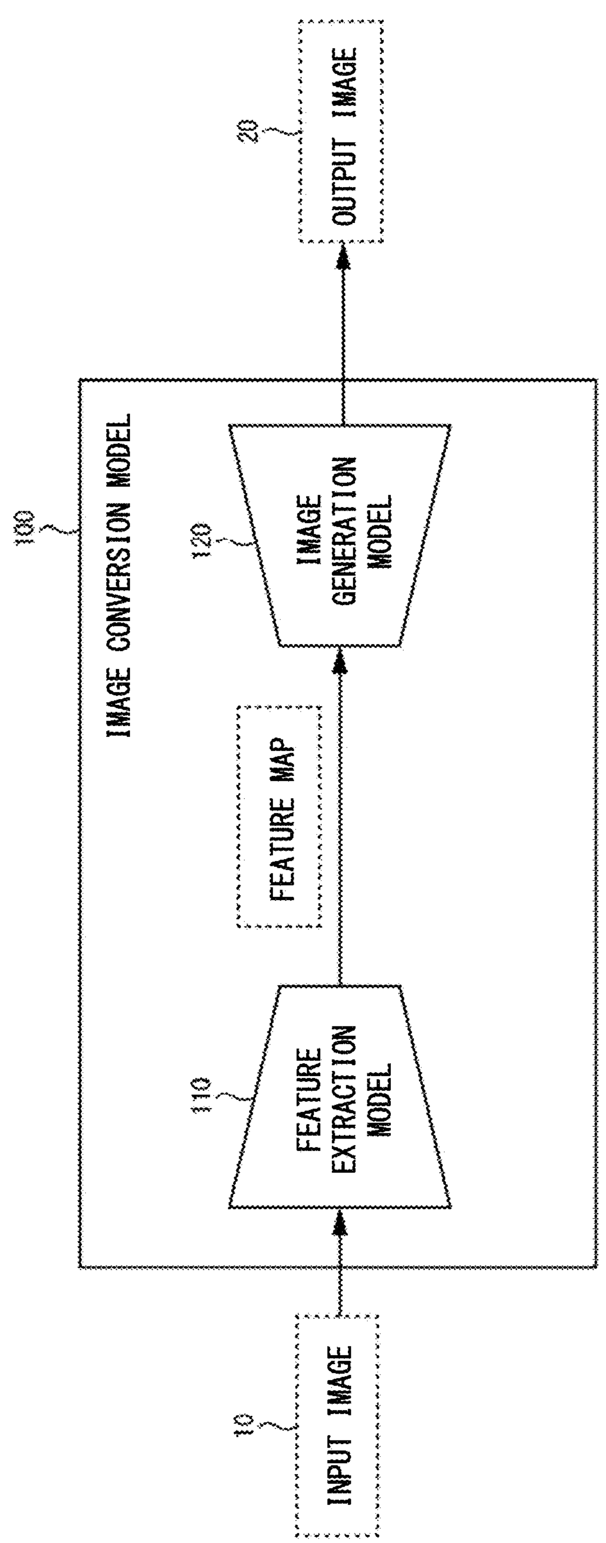
FIG. 8 is a diagram illustrating a configuration of an image conversion model.

For example, the image conversion model 100 is configured to extract features from the input image 10 and generate the output image 20 based on the extracted features. FIG. 8 is a diagram illustrating a configuration of the image conversion model 100. The image conversion model 100 includes two models: a feature extraction model 110 and an image generation model 120. The feature extraction model 110 is configured to extract a feature map from the input image 10. Here, the feature map extracted from the image is a set of features obtained from each of a plurality of partial regions included in the image. The image generation model 120 is configured to generate the output image 20 from the feature map.

Both the feature extraction model 110 and the image generation model 120 are configured as any type of machine learning-based model. For example, both the feature extraction model 110 and the image generation model 120 include neural networks.

Note that the image conversion model 100 may use the class information corresponding to the input image 10 to generate the output image 20. In this case, the image conversion model 100 further uses the first class information 54 when the output image 20 is generated from the first training image 52, for example. For example, the first training image 52 is input to the image generation model 120. Here, the techniques disclosed in Non Patent Literature 2, for example, can be used as the techniques of using the class information in the model for generating the image.

<Acquisition of First Training Data Set 50: S102>

The acquisition unit 2020 acquires the first training data set 50 (S102). There are various methods by which the acquisition unit 2020 acquires the first training data set 50. For example, the first training data set 50 is stored in an arbitrary storage device in advance in a manner that the first training data set 50 can be acquired from the model training apparatus 2000. In this case, the acquisition unit 2020 reads the first training data set 50 from the storage device. In another example, the acquisition unit 2020 may acquire the first training data set 50 by receiving the first training data set 50 transmitted from another device.

<Training of Image Conversion Model 100: S104 to S110>

The training execution unit 2040 trains the image conversion model 100 using the first training data set 50. As described above, the training execution unit 2040 inputs the first training image 52 to the image conversion model 100 (S104) and inputs the output image 20 output from the image conversion model 100 to the discrimination model 200 (S106). Furthermore, the training execution unit 2040 calculates the first loss representing the magnitude of the difference between the discrimination data 40 output from the discrimination model 200 and the first class information 54, and updates the image conversion model 100 using the first loss. Note that as a concrete method of updating the parameter of the model based on the loss, various existing methods can be used.

Here, various functions that can represent the magnitude of the difference between the discrimination data 40 and the first class information 54 can be used as a loss function for calculating the first loss (hereinafter, a first loss function). For example, following Equation (1) can be used as the first loss function.

[Equation 1]

$$L1(x1, t) = -\sum_{c=1}^{N} \alpha_c \sum_{i=1}^{M} t1_{i,c} * \log D(G(x1))_{i,c} \quad (1)$$

Here, x1 and t1 represent the first training image 52 and the first class information 54, respectively. L1(x1, t) represents the first loss calculated using the first training image x1 and the first class information t1. c represents an identifier of the class. N represents a total number of classes. α_c represents a weight to be given to the class of the identifier c. Note that a method of calculating the weight is disclosed in Non Patent Literature 3. Also, the symbol "_" represents a subscript. i represents an identifier of an image region to be identified. M represents a total number of image regions included in the output image 20. For example, in a case where each pixel is treated as an image region, and the numbers of pixels in the vertical direction and the horizontal direction in the output image 20 are H and W, respectively, M=H*W. t1_i,c indicates 1 when the class of the image region i is c in the first class information t1 and indicates 0 when the class of the image region i is not c in the first class information t1. G(x1) represents an output image 20 generated by inputting the first training image x1 to the image conversion model 100. Note that in a case where the first class information 54 is also input to the image conversion model 100, G(x1, t1) is used instead of G(x1). D(G(x1)) represents the discrimination data 40 output by the discrimination model 200 in response to an input of the output image 20. D(G(x1))_i,c is a value indicated for the class c by the score vector corresponding to the image region i in the discrimination data 40. In other words, it represents the probability that the class of the image region i of the output image 20 computed by the discrimination model 200 is c.

The training execution unit 2040 may further calculate a loss based on the difference between the first training image 52 and the output image 20, and may update the image conversion model 100 based on both the loss and the first loss described above. For example, the training execution unit 2040 calculates the overall loss as a weighted sum of these two losses and updates the image conversion model 100 so as to reduce the overall loss in this case.

As the loss based on the difference between the first training image 52 and the output image 20, patchwise contrastive loss disclosed in Non Patent Literature 1 and cycle consistency loss disclosed in Non Patent Literature 4, for example, can be used. However, the loss based on the difference between the first training image 52 and the output image 20 is not limited to those disclosed in these Non Patent Literatures. In addition, a technique described later may be employed when the patchwise contrastive loss is used.

Note that the loss may be calculated collectively for the plurality of first training data sets 50. In this case, the loss for training the image conversion model 100 can be generalized, for example, by the following equation.

[Equation 2]

$$L_G(S1) = \mathbb{E}_{(x1,t1)\sim S1}[L_d(x1) + \beta * L1(x1, t1)] \tag{2}$$

Here, the set S1 is a set of first training data sets 50. L_G(S1) is a loss calculated using the set S1. L_d(x1) is calculation based on a difference between the first training image x1 and the output image 20 obtained by inputting x1 to the image conversion model 100. For example, a patchwise contrastive loss L_pw to be described later can be used as L_d. β is a weight to be given to the first loss.

<As to Discrimination Model 200>

As described above, the discrimination model 200 identifies, for each of the plurality of image regions included in the input image, true-or-fake and the class of the image region. Here, when the "fake image region" is treated as one class, the discrimination model 200 can be regarded as a model that performs class identification for each of the plurality of image regions included in the input image, that is, a model that performs semantic segmentation. Therefore, various models capable of achieving semantic segmentation can be adopted as the discrimination model 200. As such a model, it is possible to adopt a model constituted by an encoder and a decoder similarly to the OASIS discriminator disclosed in Non Patent Literature 3, for example.

Figure 9:
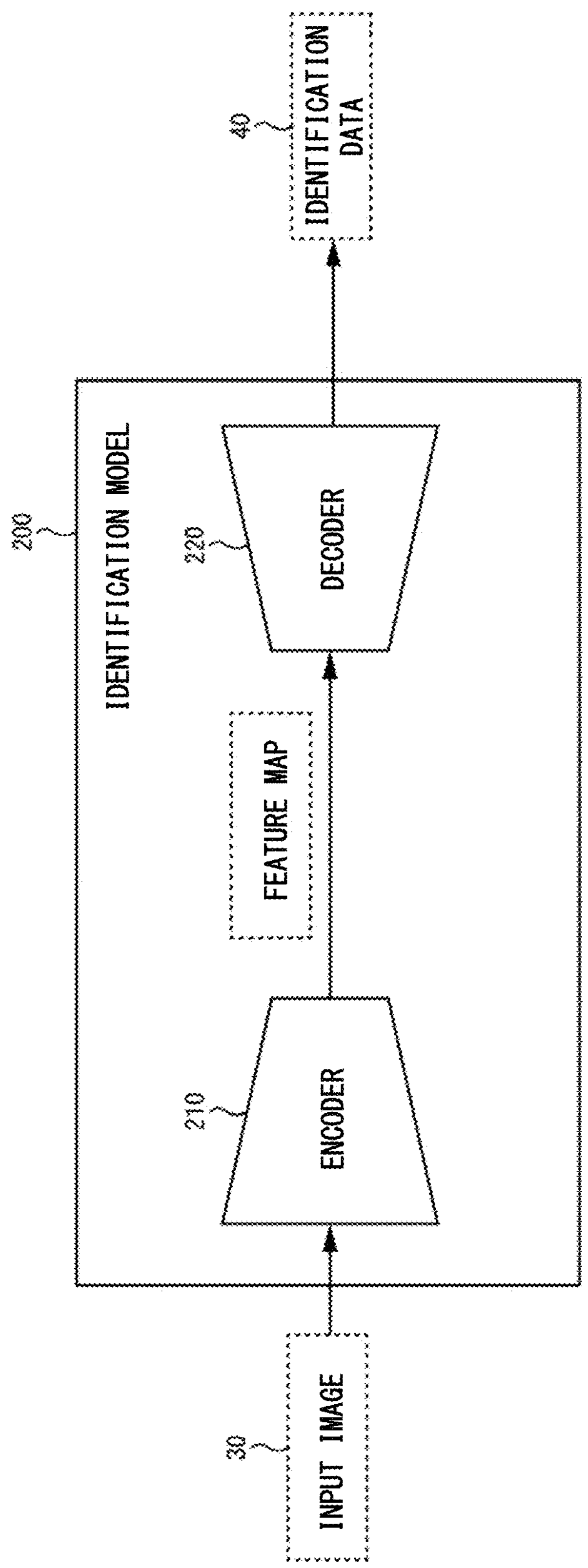
FIG. 9 is a diagram illustrating a configuration of a discrimination model.

FIG. 9 is a diagram illustrating a configuration of the discrimination model 200. An encoder 210 acquires the input image 30 as an input and generates a feature map of the input image 30. A decoder 220 acquires the feature map output from the encoder 210 as an input and computes the discrimination data 40 from the feature map. For example, both the encoder 210 and the decoder 220 are constituted by a plurality of resblocks like the OASIS discriminator. In addition, a skip connection may be provided between the encoder 210 and the decoder 220 such that an intermediate output of the encoder 210 can also be utilized by the decoder 220.

The discrimination model 200 may be trained in advance or may be trained along with the image conversion model 100. In the latter case, the model training apparatus 2000 trains the image conversion model 100 and the discrimination model 200 by training a generative adversarial network constituted by the image conversion model 100 and the discrimination model 200, for example. Hereinafter, this case will be further described.

The acquisition unit 2020 acquires a second training data set 60 and a third training image 70 to be used for training the discrimination model 200. The second training data set 60 includes a second training image 62 and second class information 64. The second training image 62 is a real image representing a scene in the second environment. For example, the second training image 62 is generated by actually capturing the scene in the second environment with a camera. The second class information 64 indicates a class of each image region included in the second training image 62. The third training image 70 is an image representing a scene in the first environment.

The second training data set 60 is utilized to obtain the discrimination model 200 that can correctly identify classes of real image regions. The training execution unit 2040 obtains the discrimination data 40 by inputting the second training image 62 to the discrimination model 200. Then, the training execution unit 2040 calculates a second loss using the discrimination data 40 and the second class information 64.

Here, since the second training image 62 is a real image, it is desirable that the discrimination model 200 can correctly identify the class of each image region included in the second training image 62. In other words, it is preferable that the classes indicated by the second class information 64 completely match the classes specified by the discrimination data 40 for all the image regions. Therefore, the second loss is further reduced as the class indicated by the discrimination data 40 for each image region further matches the class indicated by the second class information 64.

On the other hand, the third training image 70 is used to obtain the discrimination model 200 capable of correctly identifying the fake image regions. The training execution unit 2040 obtains the output image 20 by inputting the third training image 70 to the image conversion model 100. Furthermore, the training execution unit 2040 obtains the discrimination data 40 by inputting the output image 20 to the discrimination model 200. Then, the training execution unit 2040 calculates a third loss using the discrimination data 40.

Note that in a case where the image conversion model 100 uses the class information to generate the output image 20, the acquisition unit 2020 further acquires class information corresponding to the third training image 70. Then, the training execution unit 2040 obtains the output image 20 by inputting the third training image 70 and the class information to the image conversion model 100.

Here, since the output image 20 input to the discrimination model 200 is a fake image, it is preferable that the discrimination model 200 can identify each image region included in the third training image 70 as a fake image region. In other words, it is preferable that the discrimination data 40 obtained using the third training image 70 indicate that all image regions are fake image regions. Thus, the third loss is further reduced as the probability that each image region is a fake image region, which is indicated by the discrimination data 40, is higher.

From the viewpoint described above, the training execution unit 2040 updates the parameter that can be trained by the discrimination model 200 using the second loss calculated using the second training data set 60 and the third loss calculated using the third training image 70. For example, the training execution unit 2040 calculates a weighted sum of the second loss and the third loss, and updates the parameter that can be trained by the discrimination model 200 so as to reduce the weighted sum. For example, this weighted sum can be expressed by following Equation (3).

[Equation 3]

$$L_D(x2, t2, x3) = L2(x2, t2) + \gamma * L3(x3) \tag{3}$$

$$L2(x2, t2) = -\sum_{c=1}^{N} \alpha_c \sum_{i=1}^{M} t2_{i,c} * \log D(x2)_{i,c}$$

$$L3(x3) = -\sum_{i=1}^{M} \log D(G(x3))_{i,c=N+1}$$

The symbols that are also included in Equation (1) from among the symbols included in Equation (3) have the same meanings as those in Equation (1) unless otherwise particularly described. x2, t2, and x3 represent the second training image 62, the second class information 64, and the third training image 70, respectively. L_D(x2,t2,x3) represents a loss for training the discrimination model 200 calculated using the second training image x2, the second class information t2, and the third training image x3. L2(x2,t2) represents the second loss calculated using the second training image x2 and the second class information t2. L3(x3) represents the third loss calculated using the third training image x3. y is a weight to be given to the third loss. t2_i,c represents 1 when the class of the image region i is c in the second class information t2 and indicates 0 when the class of the image region i is not c in the second class information t2. D(x2) represents the discrimination data 40 output by the discrimination model 200 in response to an input of the second training image x2. D(x2)_i,c represents a probability that the class of the image region i is c, which is indicated by the discrimination data 40.

G(x3) represents an output image 20 output by the image conversion model 100 in response to an input of the third training image x3. D(G(x3)) represents the discrimination data 40 output by the discrimination model 200 in response to an input of the output image 20. D(G(x3))_i,c=N+1 represents a probability that the image region i is a fake image region, which is indicated by the discrimination data 40. Here, the score vector of the discrimination data 40 indicates the probability that the target image region is a fake image region in the (N+1)-th element.

Note that the loss L_D for training the discrimination model 200 may also be calculated collectively for the plurality of second training data sets 60 and third training images 70, similarly to the loss L_G for training the image conversion model 100. In this case, the loss L_D can be generalized as follows.

[Equation 4]

$$L_D(S2, S3) = \mathbb{E}_{(x2,t2)\sim S2, x3\sim X3}[L2(x2, t2) + \gamma * L3(x3)] \tag{4}$$

Here, the set S2 is a set of second training data sets 60, and the set X3 is a set of third training images 70.

The training execution unit 2040 repeatedly performs both the training of the image conversion model 100 and the training of the discrimination model 200, thereby improving accuracy of both the image conversion model 100 and the discrimination model 200. For example, the training execution unit 2040 alternately repeats the training of the image conversion model 100 and the training of the discrimination model 200. In another example, the training execution unit 2040 may alternately repeat the training of the image conversion model 100 a plurality of times and repeat the training of the discrimination model 200 a plurality of times. However, the number of times the image conversion model 100 is trained may be different from the number of times the discrimination model 200 is trained.

<Output of Processing Result>

As a result of the processing, the model training apparatus 2000 outputs information with which it is possible to identify the trained image conversion model 100 (hereinafter referred to as output information). The output information includes, at least, a group of parameters of the image conversion model 100 obtained by the training. In addition to this, the output information may include a program for implementing the image conversion model 100. In addition, the output information may further include a parameter group of the discrimination model 200 and a program for implementing the discrimination model 200.

A manner of outputting the output information is arbitrary. For example, the model training apparatus 2000 puts the output information in an arbitrary storage unit. In another example, the model training apparatus 2000 transmits the output information to another apparatus (for example, an apparatus that is used for operation of the image conversion model 100).

<Regarding Technique for Calculating Patchwise Contrastive Loss>

Here, techniques for calculation in a case where a patchwise contrastive loss is used for training the image conversion model 100 will be described. First, the patchwise contrastive loss will be briefly described.

FIG. 10 is a diagram illustrating a method of calculating the patchwise contrastive loss. The training execution unit 2040 obtains the output image 20 by inputting the first training image 52 to the image conversion model 100. Also, the training execution unit 2040 obtains a first feature map 130 that is a feature map of the first training image 52 computed by the feature extraction model 110. Furthermore, the training execution unit 2040 inputs the output image 20 to the feature extraction model 110 to obtain a second feature map 140 that is a feature map of the output image 20. The training execution unit 2040 calculates the patchwise contrastive loss using the first feature map 130 and the second feature map 140.

More specifically, the training execution unit 2040 extracts features corresponding to each of a positive example patch and one or more negative example patches of the first training image 52, from the first feature map 130. Also, the training execution unit 2040 extracts the features corresponding to a positive example patch of the output image 20 from the second feature map 140.

Here, the positive example patch and the negative example patch will be described. FIG. 11 is a diagram illustrating the positive example patch and the negative example patch. Both a positive example patch 522 and a negative example patch 524 are image regions that are parts of the first training image 52. Also, a positive example patch 22 is an image region representing the same location as the location represented by the positive example patch 522 from among some of the image regions of the output image 20. In this manner, the image region that is a target of feature extraction in both the first training image 52 and the output image 20 is referred to as a positive example patch. On the other hand, the image region that is a target of feature extraction only in the first training image 52 will be referred to as a negative example patch. Hereinafter, a combination of the positive example patch 522, the negative example patch 524, and the positive example patch 22 will be referred to as a patch set.

As illustrated in FIG. 11, the features included in the first feature map 130 include features corresponding to each image region in the first training image 52. Thus, the training execution unit 2040 extracts the features corresponding to each of the positive example patch 522 and the negative example patch 524 from the first feature map 130. Similarly, the training execution unit 2040 extracts the features corresponding to the positive example patch 22 from the second feature map 140.

The training execution unit 2040 generates one or more patch sets for the pair of the first training image 52 and the output image 20. Then, the training execution unit 2040 extracts features from the first feature map 130 and the second feature map 140 for each patch set.

Here, the position of the positive example patch is randomly selected in Non Patent Literature 1. In this regard, the training execution unit 2040 is innovative in that it intensively extracts a positive example patch from an image region belonging to a specific class (hereinafter, a specific region). The term "intensively" as used herein means that the number of cases in which the positive example patch 522 is extracted from the specific region is greater than the number of cases in which the positive example patch 522 is extracted from other partial regions. It is possible to cause the image conversion model 100 to intensively learn the features (features of a specific type of object, for example) of the image region belonging to the specific class by intensively extracting the positive example patch 522 from the specific region in this manner. Therefore, the image conversion model 100 can accurately convert an image region of a specific class in the first environment into an image region in the second environment.

For example, it is assumed that the image conversion model 100 is used to perform data augmentation on the training data of the detection model illustrated using FIG. 7. In this case, it is preferable that the image conversion model 100 can accurately convert features of a car in the first environment into features of the car in the second environment. Thus, the image conversion model 100 is caused to intensively learn the features of the car by intensively using the image region of the car as a positive example patch.

Note that a specific method of intensively using an image region of a specific class as a positive example patch will be described later, and first, a method of calculating the patchwise contrastive loss will be described more specifically.

The training execution unit 2040 calculates the patchwise contrastive loss using the features corresponding to the positive example patch 522, the features corresponding to the negative example patch 524, and the features corresponding to the positive example patch 22 obtained for each patch set. A loss of one patch set is calculated as a cross entropy loss expressed by following Equation (5), for example.

[Equation 5]

$$y(v, vp, vn) = -\log\left[\frac{\exp\left(v \cdot \frac{vp}{\tau}\right)}{\exp\left(v \cdot \frac{vp}{\tau}\right) + \sum_{k=1}^{N} \exp\left(v \cdot \frac{vn_k}{\tau}\right)}\right] \tag{5}$$

where y(v,vp,vn) represents the cross-entropy loss computed for the features v, vp, and vn. v represents the features corresponding to the positive example patch 22. vp represents the features corresponding to 522. vn represents the set of features corresponding to the negative example patch 524. i is a temperature parameter in softmax with temperature, and is pre-defined constant. N represents the total number of negative example patches 524. vn_k represents the features corresponding to the k-th negative example patch 524.

In a case where there is one patch set, the patchwise contrastive loss is calculated by above Equation (5). On the other hand, the patchwise contrastive loss can be generalized as following Equation (6) if the case where there is a plurality of patch sets is also taken into consideration.

[Equation 6]

$$L_{pw}(Sp) = \sum_{s \in Sp} y(v_s, vp_s, vn_s) \tag{6}$$

Here, L_pw(S) represents the patchwise contrastive loss obtained using a set Sp of patch sets. s represents one patch set. v_s represents the features corresponding to the positive example patch 22 of the patch set s. vp_s represents the features corresponding to the positive example patch 522 of the patch set s. vn_s represents the set of features corresponding to the negative example patch 524 of the patch set s.

The feature extraction model 110 may be configured to perform multistage feature extraction. An example of such a feature extraction model 110 is a convolutional neural network having a plurality of convolution layers. In a convolutional neural network having a plurality of convolution layers, the n-th convolution layer performs a convolution operation of the (n−1)-th filter on the (n−1)-th feature map output from the (n−1)-th convolution layer to output the n-th feature map (n is an integer of 2 or more).

In a case where multistage feature extraction is performed in this manner, not only the first feature map 130 and the second feature map 140, which are feature maps obtained at the end, but also feature maps obtained in intermediate stages can be used for calculation of the patchwise contrastive loss. In other words, the plurality of feature maps obtained from the first training image 52 and the plurality of feature maps obtained from the output image 20 can be used for calculating the patchwise contrastive loss.

For example, in a case where the feature extraction model 110 is an n-layer convolutional neural network, n feature maps can be obtained by obtaining a feature map from each layer. Then, the features corresponding to 522, the negative example patch 524, and the positive example patch 22 can then be extracted from each of n feature maps. Then, the training execution unit 2040 extracts the features corresponding to 522, the negative example patch 524, and the positive example patch 22 from each of the n feature maps, and calculates the patchwise contrastive loss using the extracted features.

In a case where the patchwise contrastive loss is calculated using the plurality of feature maps obtained from the first training image 52 and the output image 20, the patchwise contrastive loss is expressed by following Equation (7), for example.

[Equation 7]

$$L_{pw}(Sp) = \sum_{l \in L} \sum_{s \in Sp} y(v_s^l, vp_s^l, vn_s^l) \tag{7}$$

Here, L represents the set of layers for feature extraction and l represents a layer. v^l_s represents the features corresponding to the positive example patch 22 of the patch set s that is obtained from the feature map output from the 1-th layer of the feature extraction model 110 to which the output image 20 is input. vp^l_s represents the features corresponding to the positive example patch 522 of the patch set s that is obtained from the feature map output from the l-th layer of the feature extraction model 110 to which the first training image 52 is input. vn^l_s represents the set of features corresponding to the negative example patch 524 of the patch set s that is obtained from the feature map output from the l-th layer of the feature extraction model 110 to which the first training image 52 is input. Note that the symbol "^" represents a superscript.

Furthermore, the patchwise contrastive loss may be calculated collectively for the plurality of first training images 52 as described above. In this case, the patchwise contrastive loss can be generalized by following Equation (8).

[Equation 8]

$$L_{pw}(Sp, X1) = \mathbb{E}_{x1 \sim X1} \overline{\sum_{l \in L}} \overline{\sum_{s \in Sp}} y(v_s^l, vp_s^l, vn_s^l) \tag{8}$$

Here, X1 represents a set of first training images 52, and x1 represents one first training image 52 selected from the set.

The training execution unit 2040 calculates the first loss and the patchwise contrastive loss using one or more first training data sets 50 and updates the image conversion model 100 using the comprehensive loss calculated using the first loss and the patchwise contrastive loss. For example, this comprehensive loss is expressed by Equation (2) described above.

<<As to Generation of Patch Set>>

The training execution unit 2040 generates patch sets for the first training image 52 and the output image 20. As described above, one patch set includes one positive example patch 522, one or more negative example patches 524, and one positive example patch 22. For example, the training execution unit 2040 performs a process of extracting the positive example patch 522 from the first training image 52, and then performs a process of extracting one or more negative example patches 524 from a region other than the positive example patch 522 in the first training image 52 and a process of extracting the positive example patch 22 from the output image 20.

As described above, it is preferable that the positive example patch 522 be extracted intensively from the specific region. Thus, the training execution unit 2040 detects the specific region from the first training image 52 in order to use the specific region for extraction of the positive example patch 522. Here, existing techniques can be used as techniques to detect image regions of the specific class from the first training image 52. Hereinafter, the "specific class" will be referred to as a "target class".

The target class may be defined in advance or may be designated by a user. In the latter case, the training execution unit 2040 acquires information representing the target class, and detects image regions of the target class indicated by the information as specific regions. The information indicating the target class is obtained as a result of a user's input, for example.

Hereinafter, some examples of the method of extracting the positive example patch 522 based on the detected specific region will be illustrated.

Method 1

First, the training execution unit 2040 determines which of the inside and the outside of the specific region the positive example patches 522 are to be extracted from. The determination is made such that the number of the positive example patches 522 extracted from inside the specific region is greater than the number of the positive example patches 522 extracted from outside the specific region. In this manner, the positive example patches 522 are extracted intensively from the specific region.

For example, the above determination is made probabilistically. A possible way to probabilistically select one of the two options is to sample values from a Bernoulli distribution and make a determination based on the sampled values, for example. More specifically, the positive example patches 522 are extracted from inside the specific region in a case where the sample value is 1, whereas the positive example patches 522 are extracted from outside the specific region in a case where the sample value is 0, for example. In this case, the number of the positive example patches 522 extracted from the inside of the specific region can be stochastically greater than the number of the positive example patches 522 extracted from outside the specific region by setting the probability that the sample value is 1 to be greater than 50%.

After determining which of the inside and the outside of the specific region the positive example patches 522 are to be extracted, the training execution unit 2040 extracts the positive example patches 522 based on the determination. Here, the size (hereinafter, a patch size) of the positive example patches 522 is defined in advance. In a case where the positive example patches 522 are extracted from the inside of the specific region, the training execution unit 2040 extracts regions with the patch size from any parts of the specific region, and handles the regions as the positive example patches 522. On the other hand, in a case where the positive example patches 522 are extracted from the outside of the specific region, the training execution unit 2040 selects regions with the patch size from any parts outside the specific region, and determines the selected regions as the positive example patches 522. Existing techniques can be used to arbitrarily select a region of a predetermined size from a certain region.

Note that in a case where the positive example patches 522 are extracted from the inside of the specific region, some of the positive example patches 522 may be outside the specific region. For example, the positive example patches 522 are extracted so as to satisfy the condition that "a predetermined ratio or more of the positive example patches 522 are within the specific region" in this case.

Method 2

The training execution unit 2040 extracts the positive example patches 522 such that the more a region overlap the specific region, the more the region is likely to be extracted as the positive example patches 522. Therefore, for example, the training execution unit 2040 generates an extraction probability map indicating a higher extraction probability for a higher overlap ratio with the specific region. For example, the extraction probability map is generated as a probability distribution that indicates, for each pixel in the first training image 52, the probability that a region with the patch size whose reference point (the upper left edge of each positive example patch 522, for example) is that pixel is extracted as the positive example patch 522. In order to increase the extraction probability with a higher overlap ratio with the specific region, the extraction probability map is generated such that, for each pixel, the higher the degree of overlap between the region with the patch size whose reference point is that pixel and the specific region is, the higher the extraction probability is. Note that the extraction probability map can also be said to indicate, for each partial region with the patch size included in the first training image 52, the probability that the partial region is extracted as the positive example patch 522. Then, the extraction probability of each partial region is set higher as the degree of overlap between the partial region and the specific region is higher.

In order to generate such an extraction probability map, for example, first, the training execution unit 2040 sets a value, for each pixel of the extraction probability map, that represents the degree of overlap between the region with the patch size whose reference point is that pixel and the specific region. Thereafter, the training execution unit 2040 changes the value of each pixel of the extraction probability map to a value obtained by dividing the value by the sum of the values of all the pixels.

Figure 12:
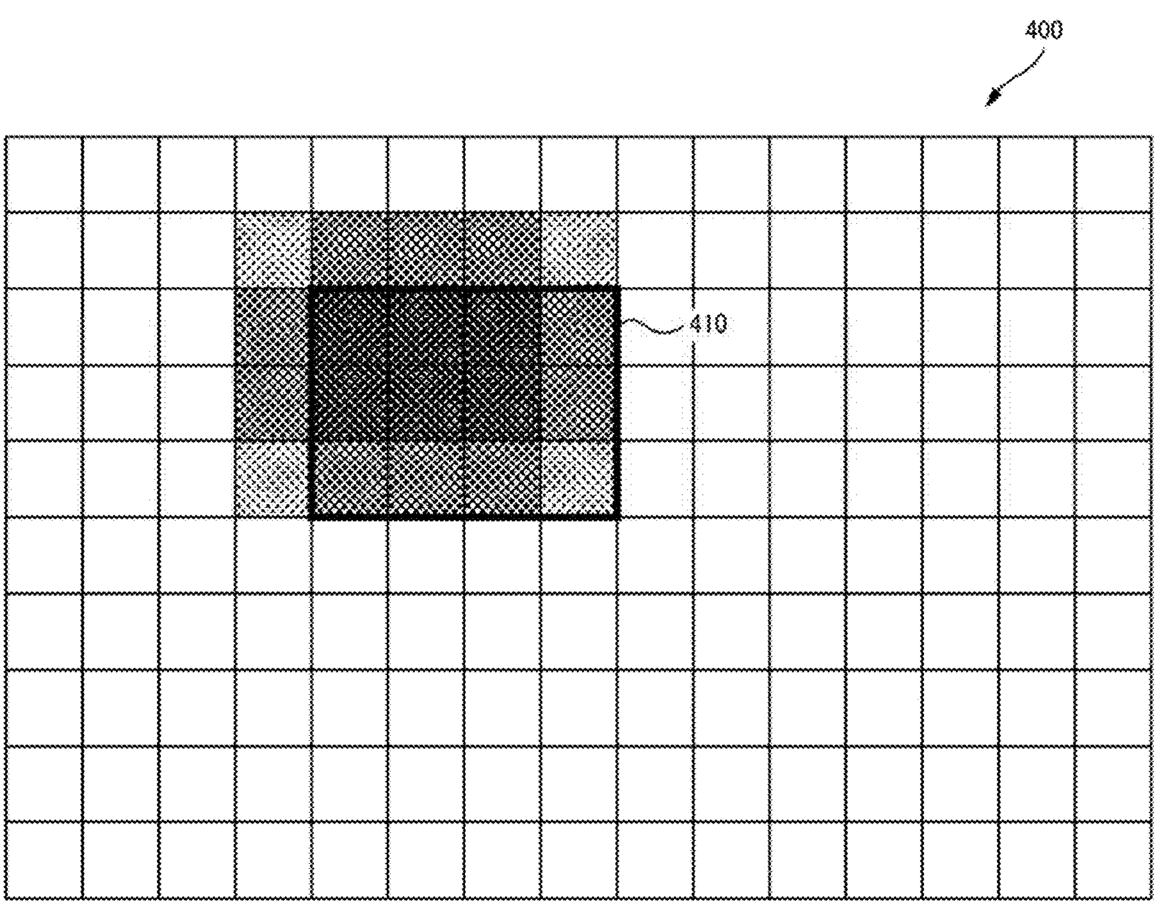
FIG. 12 is a diagram illustrating an extraction probability map.

FIG. 12 is a diagram illustrating the extraction probability map. In this example, the size of each positive example patch 522 is 2×2. The size of the specific region 410 is 4×3. Each pixel in the extraction probability map 400 indicates a higher extraction probability as the degree of overlap between the positive example patch 522 and the specific region is higher in a case where the positive example patch 522 is extracted with the pixel included as the upper left edge. Here, pixels having higher extraction probabilities are represented by darker dots in FIG. 12. Therefore, the pixels represented by darker dots represent higher probabilities that the positive example patch 522 is extracted with the pixels included as the reference point in FIG. 12.

The training execution unit 2040 samples the coordinates of pixels from the probability distribution represented by the extraction probability map and extracts, as the positive example patch 522, the region with the patch size whose reference point is the sampled coordinates.

Method 3

In a case where the target class indicates a class of an object, the object may be further categorized into smaller categories, and the extraction probability of each pixel in the aforementioned extraction probability map may be determined based on the smaller categories. In a case where the target class is a car, for example, types such as a passenger vehicle, a truck, and a bus can be set as the smaller categories. Hereinafter, the classes according to the smaller categories to which objects included in the first training image 52 belong will be referred to as subclasses.

In a case in which the smaller categories are taken into consideration, an importance in the training of the image conversion model 100 may differ depending on each subclass among the objects belonging to the target class. For example, an object of a class that appears in the first training image 52 less frequently can be said as an important object in the training since it is necessary to enable the image conversion model 100 to learn the features of the object through a small amount of training.

As a specific example, it is assumed that an image conversion model 100 is trained to generate the output image 20 representing a condition of a nighttime road from the input image 10 that is an image representing a condition of a daytime road. Here, it is assumed that trucks appear less frequently than passenger cars on a road imaged to generate the first training image 52. In this case, the opportunity to learn the features of truck is less than the opportunity to learn the features of passenger car. Therefore, it is necessary to enable the image conversion model 100 to learn the features of truck with less training.

Thus, higher importance in the training is placed for the subclasses that appear less frequently. More specifically, the training execution unit 2040 generates the extraction probability map such that the extraction probabilities are higher for the specific regions representing objects belonging to subclasses that appear less frequently in the first training image 52. Therefore, a higher weight is applied to each subclass as the subclass appears less frequently.

The training execution unit 2040 sets, for each pixel of the extraction probability map, a value obtained by multiplying the degree of overlap between the pixel and the specific region by a weight corresponding to the subclass of the object represented by the specific region. Then, the training execution unit 2040 changes the value of each pixel to a value obtained by dividing the value by the sum of the values of all the pixels.

The training execution unit 2040 samples the coordinates of pixels from the probability distribution represented by this extraction probability map and extracts, as the positive example patch 522, the region with the patch size whose reference point is the sampled coordinates.

Here, the weight of each subclass may be defined in advance or may be determined by the training execution unit 2040. In the latter case, the training execution unit 2040 performs a process of detecting objects of a target class for each first training image 52 acquired by the acquisition unit 2020 before the extraction of the positive example patch 522 and counting the number of detected objects. In this manner, the number of times each subclass appears in the training image group is determined. The training execution unit 2040 determines the weight for each subclass based on the number of times each subclass appears. The weight is determined such that the weight of the subclass appearing a smaller number of times is larger.

<<Method of Extracting Negative Example Patch 524

The training execution unit 2040 arbitrarily (for example, randomly) extracts regions with the patch size from regions included in the first training image 52 other than the regions extracted as the positive example patch 522, and uses those regions as the negative example patches 524. As described above, one patch set may include a plurality of negative example patches 524. The number of negative example patches 524 included in one patch set is defined in advance.

<<Method of Extracting Positive Example Patch 22>>

The training execution unit 2040 extracts the positive example patch 22 from the position of the output image 20 corresponding to the position on the first training image 52 from which the positive example patch 522 has been extracted. In other words, the same coordinates as the coordinates used as the reference point for the extraction of the positive example patch 522 are used as the coordinates of the pixel used as the reference point for the extraction of the positive example patch 22.

Other Methods

In the model training apparatus 2000 described above, the positive example patch 522 is extracted intensively from the image region of the target class such that the features of objects of the target class are learned with particularly high accuracy. However, the method of ensuring that the features of objects of the target class are learned with high accuracy is not limited to the method of extracting the positive example patch 522 intensively from the specific region.

For example, the model training apparatus 2000 calculates the patchwise contrastive loss such that an influence of the loss calculated using features corresponding to the positive example patch 522 extracted from the specific region (for example, the cross entropy loss described above) is greater than an influence of the loss calculated using the features corresponding to the positive example patch 522 extracted from other regions, in addition to or instead of extracting the positive example patch 522 intensively from the specific region. Note that in a case where the method of extracting the positive example patch 522 intensively from the specific region is not adopted, the positive example patch 522 is extracted from any part of the first training image 52 with the same probability, for example.

Hereinafter, a method of determining a degree of influence of the loss based on the features corresponding to the positive example patch 522 depending on which of the inside and the outside of the specific region the positive example patch 522 has been extracted from will be described.

For example, the training execution unit 2040 calculates the patchwise contrastive loss using following Equation (9).

[Equation 9]

$$L_{pw}(Sp) = \sum_{s \in Sp} w_s * y(v_s, vp_s, vn_s) \tag{9}$$

$$w_s = \begin{cases} a & \text{(In a case where the positive example patch 522 has been extracted from the inside of the specific region)} \\ b & \text{(In a case where the positive examle patch 522 has been extracted from the outside of the specific region)} \end{cases}$$

-continued where $a > b > 0$

In Equation (7), the loss calculated for each patch set is multiplied by a weight a in a case where the positive example patch 522 included in the patch set has been extracted from the inside of the specific region or by a weight b in a case where the positive example patch 522 included in the patch set has been extracted from the outside of the specific region. Since a>b>0, the influence of the loss in a case where the positive example patch 522 has been extracted from the inside of the specific region is greater than the influence of the loss in a case where the positive example patch 522 has been extracted from the outside of the specific region.

Note that the same applies to the case where the patchwise contrastive loss is calculated using Equations (7) and (8) described above. That is, in a case where feature maps are obtained from a plurality of layers of the feature extraction model 110, the weighting described above should be applied in the loss computed for the feature maps obtained from the respective layers.

In addition, a weight similar to w_s may be used for calculating the first loss, the second loss, and the third loss. In this case, these losses can be calculated by following Equation (10), for example.

[Equation 10]

$$L1(x1, t1) = -\sum_{c=1}^{N} a_c \sum_{i=1}^{M} w_i * t1_{i,c} * \log D(G(x1))_{i,c}$$

$$L2(x2, t2) = -\sum_{c=1}^{N} \alpha_c \sum_{i=1}^{M} w_i * t2_{i,c} * \log D(x2)_{i,c}$$

$$L3(x3) = -\sum_{i=1}^{M} w_i * \log D(G(x3))_{i,c=N+1}$$

$$w_i = \begin{cases} a & \text{(In a case where the image region } i \text{ is included in the specific region)} \\ b & \text{(In a case where the image region } i \text{ is not included in the specific region)} \end{cases}$$

where $a > b > 0$

In a case where the feature map is obtained from a plurality of layers, weights may be set for each layer or weights may be set only for specific layers based on the relationship between the size of the partial region of the input image corresponding to one cell of the feature map and the patch size. This method will be described below.

When the feature map is obtained from a plurality of layers, the size of the partial region of the input image corresponding to one cell of the feature map is different for each feature map (for each layer). For example, it is assumed that a convolution process with a filter having a size of 3×3 is performed in each layer. In this case, one cell of the first feature map corresponds to a partial region having a size of 3×3 in the input image. In addition, one cell of the second feature map corresponds to a set of cells having a size of 3×3 in the first feature map. From this, one cell of the second feature map corresponds to a region having a size of 9×9 in the input image. For similar reasons, one cell of the third feature map corresponds to a region of size 27×27 in the input image. As described above, the feature map generated by the later layers correspond to larger partial regions of the input image.

In this regard, it is considered that in the plurality of feature maps generated from the mutually different layers for the first training image 52, the features of the positive example patch 522 are more accurately expressed as feature maps in which the sizes of the partial regions of the first training image 52 corresponding to one cell are closer to the patch size. The same applies to the negative example patch 524 and the positive example patch 22.

Thus, the training execution unit 2040 calculates the patchwise contrastive loss such that for the feature maps in which the sizes of the partial regions of the first training image 52 corresponding to one cell are closer to the patch size, larger weights are applied to the features extracted from the feature maps. The same applies to the positive example patch 22 and the negative example patch 524. In this case, the patchwise contrastive loss is calculated using following Equation (11), for example.

[Equation 11]

$$L_{pw}(Sp) = \sum_{l \in L} \sum_{s \in Sp} f(z_p, z_l) * y\left(v_s^l, vp_s^l, vn_s^l\right) \tag{1}$$

where z_p is the patch size. z_l is the size of the partial region of the input image (the first training image 52 or the output image 20) corresponding to one cell of the feature map extracted from the l-th layer. f(is a function that outputs a larger value as the difference between zp and zl is smaller. Note that f(>0.

Note that only a layer in which the size of the partial region in the input image corresponding to a cell of a feature map is the closest to the patch size may be weighted by applying a weight that is greater than 1 only to the layer l in which the difference between z_p and z_l is the smallest and not applying any weights to the other layers. Alternatively, a method of applying a weight that is greater than 1 only to a top predetermined number of layers in the ascending order of the difference between z_p and z_l may be adopted.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. And each embodiment can be appropriately combined with at least one of embodiments.

In the above-described example, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Some or all of the above-described example embodiments may be described as in the following Supplementary Notes, but are not limited to the following Supplementary Notes.

Supplementary Note 1

A model training apparatus comprising:

acquisition means for acquiring a first training data set including a first training image representing a scene in a first environment and first class information indicating a class of each of a plurality of image regions included in the first training image; and training execution means for executing training of an image conversion model that outputs an image representing a scene in a second environment in response to an input of the image representing the scene in the first environment using the first training data set, wherein the training execution means inputs the first training image to the image conversion model, inputs a first output image output from the image conversion model to a discrimination model, calculates a first loss using the discrimination data output from the discrimination model and the first class information, and updates a parameter of the image conversion model using the first loss, and wherein the discrimination data indicates, for each of a plurality of partial regions included in the image input to the discrimination model, whether or not the partial region is a fake image region, and indicates a class of the partial region when the partial region is not a fake image.

Supplementary Note 2

The model training apparatus according to claim 1, wherein the first loss is smaller as there are more image regions whose classes indicated by the discrimination data match the classes indicated by the first class information.

Supplementary Note 3

The model training apparatus according to claim 2, wherein the training execution means calculates the first loss by giving a larger weight to image regions belonging to a specific class than to image regions not belonging to the specific class.

Supplementary Note 4

The model training apparatus according to any one of claims 1 to 3, wherein the image conversion model includes a feature extraction model that extracts a feature map from an input image, and wherein the training execution means performs:

inputting the first training image to the image conversion model to acquire the first output image and a first feature map from the image conversion model, the first feature map being a feature map of the first training image;

inputting the first output image to the feature extraction model to acquire a second feature map from the feature extraction model, the second feature map being a feature map of the first output image; and updating the parameter of the image conversion model using both a feature loss calculated using the first feature map and the second feature map and the first loss.

Supplementary Note 5

The model training apparatus according to claim 4, wherein the training execution means performs:

generating one or more patch sets that are sets of a first positive example patch and a first negative example patch that are partial regions of the first training image and a second positive example patch that is a partial region at a position corresponding to the first positive example patch in the first output image; and extracting features corresponding to each of the first positive example patch and the first negative example patch from the first feature map, extracting features corresponding to the second positive example patch from the second feature map, and calculating the feature loss using each of the extracted features, and wherein the training execution means performs:

extracting, in the generation of the patch sets, the first positive example patch intensively from a specific region belonging to a specific class among regions included in the first training image; or calculating the feature loss such that an influence of a loss calculated for the patch set including the first positive example patch extracted from the specific region is larger than an influence of a loss calculated for the patch set including the first positive example patch extracted from outside of the specific region.

Supplementary Note 6

The model training apparatus according to any one of claims 1 to 5, wherein the acquisition means acquires a second training data set including a second training image representing a scene in the first environment and second class information indicating a class of each of a plurality of image regions included in the second training image, and a third training image representing a scene in the second environment, and wherein the training execution means performs:

inputting a second output image obtained by inputting the second training image to the image conversion model to the discrimination model and calculating a second loss using the discrimination data output from the discrimination model and the second class information;

inputting the third training image to the discrimination model and calculating a third loss using the discrimination data output from the discrimination model; and updating a parameter of the discrimination model using the second loss and the third loss.

Supplementary Note 7

A model training method executed by a computer comprising:

an acquisition step of acquiring a first training data set including a first training image representing a scene in a first environment and first class information indicating a class of each of a plurality of image regions included in the first training image; and a training execution step of executing training of an image conversion model that outputs an image representing a scene in a second environment in response to an input of the image representing the scene in the first environment using the first training data set, wherein in the training execution step, inputting the first training image to the image conversion model, inputting a first output image output from the image conversion model to a discrimination model, calculating a first loss using the discrimination data output from the discrimination model and the first class information, and updating a parameter of the image conversion model using the first loss, and wherein the discrimination data indicates, for each of a plurality of partial regions included in the image input to the discrimination model, whether or not the partial region is a fake image region, and indicates a class of the partial region when the partial region is not a fake image.

Supplementary Note 8

The model training method according to claim 7, wherein the first loss is smaller as there are more image regions whose classes indicated by the discrimination data match the classes indicated by the first class information.

Supplementary Note 9

The model training method according to claim 8, wherein in the training execution step, the first loss is calculated by giving a larger weight to image regions belonging to a specific class than to image regions not belonging to the specific class.

Supplementary Note 10

The model training method according to any one of claims 7 to 9, wherein the image conversion model includes a feature extraction model that extracts a feature map from an input image, and wherein in the training execution step:

inputting the first training image to the image conversion model to acquire the first output image and a first feature map from the image conversion model, the first feature map being a feature map of the first training image;

inputting the first output image to the feature extraction model to acquire a second feature map from the feature extraction model, the second feature map being a feature map of the first output image; and updating the parameter of the image conversion model using both a feature loss calculated using the first feature map and the second feature map and the first loss.

Supplementary Note 11

The model training method according to claim 10, wherein in the training execution step:

generating one or more patch sets that are sets of a first positive example patch and a first negative example patch that are partial regions of the first training image and a second positive example patch that is a partial region at a position corresponding to the first positive example patch in the first output image are generated; and extracting features corresponding to each of the first positive example patch and the first negative example patch from the first feature map, extracting features corresponding to the second positive example patch from the second feature map, and calculating the feature loss using each of the extracted features, and wherein in the training execution step:

extracting, in the generation of the patch sets, the first positive example patch intensively from a specific region belonging to a specific class among regions included in the first training image; or calculating the feature loss such that an influence of a loss calculated for the patch set including the first positive example patch extracted from the specific region is larger than an influence of a loss calculated for the patch set including the first positive example patch extracted from outside of the specific region.

Supplementary Note 12

The model training method according to any one of claims 7 to 11, wherein in the acquisition step, acquiring a second training data set including a second training image representing a scene in the first environment and second class information indicating a class of each of a plurality of image regions included in the second training image and a third training image representing a scene in the second environment, and wherein in the training execution step:

inputting a second output image obtained by inputting the second training image to the image conversion model is input to the discrimination model, and calculating a second loss using the discrimination data output from the discrimination model and the second class information;

inputting the third training image to the discrimination model, and calculating a third loss using the discrimination data output from the discrimination model; and updating a parameter of the discrimination model using the second loss and the third loss.

Supplementary Note 13

A non-transitory computer-readable medium that stores a program that causes a computer to execute:

an acquisition step of acquiring a first training data set including a first training image representing a scene in a first environment and first class information indicating a class of each of a plurality of image regions included in the first training image; and a training execution step of executing training of an image conversion model that outputs an image representing a scene in a second environment in response to an input of the image representing the scene in the first environment using the first training data set, wherein in the training execution step, inputting the first training image to the image conversion model, inputting a first output image output from the image conversion model to a discrimination model, calculating a first loss using the discrimination data output from the discrimination model and the first class information, and updating a parameter of the image conversion model using the first loss, and wherein the discrimination data indicates, for each of a plurality of partial regions included in the image input to the discrimination model, whether or not the partial region is a fake image region, and indicates a class of the partial region when the partial region is not a fake image.

Supplementary Note 14

The computer-readable medium according to claim 13, wherein the first loss is smaller as there are more image regions whose classes indicated by the discrimination data match the classes indicated by the first class information.

Supplementary Note 15

The computer-readable medium according to claim 14, wherein in the training execution step, the first loss is calculated by giving a larger weight to image regions belonging to a specific class than to image regions not belonging to the specific class.

Supplementary Note 16

The computer-readable medium according to any one of claims 13 to 15, wherein the image conversion model includes a feature extraction model that extracts a feature map from an input image, and wherein in the training execution step:

inputting the first training image to the image conversion model to acquire the first output image and a first feature map from the image conversion model, the first feature map being a feature map of the first training image;

inputting the first output image to the feature extraction model to acquire a second feature map from the feature extraction model, the second feature map being a feature map of the first output image, and updating the parameter of the image conversion model using both a feature loss calculated using the first feature map and the second feature map and the first loss.

Supplementary Note 17

The computer-readable medium according to claim 16, wherein in the training execution step:

generating one or more patch sets that are sets of a first positive example patch and a first negative example patch that are partial regions of the first training image and a second positive example patch that is a partial region at a position corresponding to the first positive example patch in the first output image are generated; and extracting features corresponding to each of the first positive example patch and the first negative example patch from the first feature map, extracting features corresponding to the second positive example patch from the second feature map, and calculating the feature loss using each of the extracted features, and wherein in the training execution step:

extracting, in the generation of the patch sets, the first positive example patch intensively from a specific region belonging to a specific class among regions included in the first training image, or calculating the feature loss such that an influence of a loss calculated for the patch set including the first positive example patch extracted from the specific region is larger than an influence of a loss calculated for the patch set including the first positive example patch extracted from outside of the specific region.

Supplementary Note 18

The computer-readable medium according to any one of claims 13 to 17, wherein in the acquisition step, acquiring a second training data set including a second training image representing a scene in the first environment and second class information indicating a class of each of a plurality of image regions included in the second training image and a third training image representing a scene in the second environment, and wherein in the training execution step:

inputting a second output image obtained by inputting the second training image to the image conversion model to the discrimination model, and calculating a second loss using the discrimination data output from the discrimination model and the second class information;

inputting the third training image to the discrimination model, and calculating a third loss using the discrimination data output from the discrimination model; and updating a parameter of the discrimination model using the second loss and the third loss.

REFERENCE SIGNS LIST

10 INPUT IMAGE
20 OUTPUT IMAGE
22 POSITIVE EXAMPLE PATCH
30 INPUT IMAGE
40 DISCRIMINATION DATA
50 FIRST TRAINING DATA SET
52 FIRST TRAINING IMAGE
54 FIRST CLASS INFORMATION
60 SECOND TRAINING DATA SET
62 SECOND TRAINING IMAGE
64 SECOND CLASS INFORMATION
70 THIRD TRAINING IMAGE
100 IMAGE CONVERSION MODEL
110 FEATURE EXTRACTION MODEL
120 IMAGE GENERATION MODEL
130 FIRST FEATURE MAP
140 SECOND FEATURE MAP
200 DISCRIMINATION MODEL
210 ENCODER
220 DECODER
400 EXTRACTION PROBABILITY MAP
410 SPECIFIC REGION
522 POSITIVE EXAMPLE PATCH
524 NEGATIVE EXAMPLE PATCH
1000 COMPUTER
1020 BUS
1040 PROCESSOR
1060 MEMORY
1080 STORAGE DEVICE
1100 INPUT/OUTPUT INTERFACE
1120 NETWORK INTERFACE
2000 MODEL TRAINING APPARATUS
2020 ACQUISITION UNIT
2040 TRAINING EXECUTION UNIT

What is claimed is:

1. A model training apparatus comprising:

at least one memory that is configured to store instructions; and at least one processor that is configured to execute the instructions to:

acquire a first training data set including a first training image representing a scene in a first environment and first class information indicating a class of each of a plurality of image regions included in the first training image; and execute training of an image conversion model using the first training data set, the image conversion model being trained to output an image representing a scene in a second environment in response to an input of the image representing the scene in the first environment, wherein the training of the image conversion model includes:

inputting the first training image to the image conversion model;

inputting a first output image output from the image conversion model to a discrimination model;

calculating a first loss using the discrimination data output from the discrimination model and the first class information; and updating a parameter of the image conversion model using the first loss, and wherein the discrimination data indicates, for each of a plurality of partial regions included in the image input to the discrimination model; whether or not the partial region is a fake image region; and a class of the partial region when the partial region is not a fake image region.

2. The model training apparatus according to claim 1, wherein the first loss is smaller as there are more image regions whose classes indicated by the discrimination data match the classes indicated by the first class information.

3. The model training apparatus according to claim 2, wherein the training execution means calculates the first loss by giving a larger weight to image regions belonging to a specific class than to image regions not belonging to the specific class.

4. The model training apparatus according to claim 1, wherein the image conversion model includes a feature extraction model that extracts a feature map from an input image, and wherein the training of the image conversion model includes:

inputting the first training image to the image conversion model to acquire the first output image and a first feature map from the image conversion model, the first feature map being a feature map of the first training image;

inputting the first output image to the feature extraction model to acquire a second feature map from the feature extraction model, the second feature map being a feature map of the first output image; and updating the parameter of the image conversion model using both a feature loss calculated using the first feature map and the second feature map and the first loss.

5. The model training apparatus according to claim 4, wherein the training of the image conversion model includes:

generating one or more patch sets each of which is a set of a first positive example patch, a first negative example patch, and a second positive example patch, the first positive example patch and the first negative example patch being partial regions of the first training image, the second positive example patch being a partial region at a position corresponding to the first positive example patch in the first output image; and extracting features corresponding to each of the first positive example patch and the first negative example patch from the first feature map, extracting features corresponding to the second positive example patch from the second feature map, and calculating the feature loss using each of the extracted features, and wherein the training of the image conversion model includes:

extracting, in the generation of the patch sets, the first positive example patch intensively from a specific region belonging to a specific class among regions included in the first training image; or calculating the feature loss such that an influence of a loss calculated for the patch set including the first positive example patch extracted from the specific region is larger than an influence of a loss calculated for the patch set including the first positive example patch extracted from outside of the specific region.

6. The model training apparatus according to claim 1, wherein the at least one processor is configured to execute the instructions further to acquire a second training data set and a third training image representing a scene in the second environment, the second training data set including a second training image representing a scene in the first environment and second class information indicating a class of each of a plurality of image regions included in the second training image, and wherein the training of the image conversion model includes:

inputting a second output image obtained by inputting the second training image to the image conversion model to the discrimination model and calculating a second loss using the discrimination data output from the discrimination model and the second class information;

inputting the third training image to the discrimination model and calculating a third loss using the discrimination data output from the discrimination model; and updating a parameter of the discrimination model using the second loss and the third loss.

7. A model training method executed by a computer comprising:

acquiring a first training data set including a first training image representing a scene in a first environment and first class information indicating a class of each of a plurality of image regions included in the first training image; and executing training of an image conversion model using the first training data set, the image conversion model being trained to output an image representing a scene in a second environment in response to an input of the image representing the scene in the first environment, wherein the training of the image conversion model includes:

inputting the first training image to the image conversion model;

inputting a first output image output from the image conversion model to a discrimination model;

calculating a first loss using the discrimination data output from the discrimination model and the first class information; and updating a parameter of the image conversion model using the first loss, and wherein the discrimination data indicates, for each of a plurality of partial regions included in the image input to the discrimination model; whether or not the partial region is a fake image region; and a class of the partial region when the partial region is not a fake image region.

8. The model training method according to claim 7, wherein the first loss is smaller as there are more image regions whose classes indicated by the discrimination data match the classes indicated by the first class information.

9. The model training method according to claim 8, wherein in the training execution step, the first loss is calculated by giving a larger weight to image regions belonging to a specific class than to image regions not belonging to the specific class.

10. The model training method according to claim 7, wherein the image conversion model includes a feature extraction model that extracts a feature map from an input image, and wherein the training of the image conversion model includes:

inputting the first training image to the image conversion model to acquire the first output image and a first feature map from the image conversion model, the first feature map being a feature map of the first training image;

inputting the first output image to the feature extraction model to acquire a second feature map from the feature extraction model, the second feature map being a feature map of the first output image; and updating the parameter of the image conversion model using both a feature loss calculated using the first feature map and the second feature map and the first loss.

11. The model training method according to claim 10, wherein the training of the image conversion model includes:

generating one or more patch sets each of which is a set of a first positive example patch, a first negative example patch, and a second positive example patch, the first positive example patch and the first negative example patch being partial regions of the first training image, the second positive example patch being a partial region at a position corresponding to the first positive example patch in the first output image are generated; and extracting features corresponding to each of the first positive example patch and the first negative example patch from the first feature map, extracting features corresponding to the second positive example patch from the second feature map, and calculating the feature loss using each of the extracted features, and wherein the training of the image conversion model includes:

extracting, in the generation of the patch sets, the first positive example patch intensively from a specific region belonging to a specific class among regions included in the first training image; or calculating the feature loss such that an influence of a loss calculated for the patch set including the first positive example patch extracted from the specific region is larger than an influence of a loss calculated for the patch set including the first positive example patch extracted from outside of the specific region.

12. The model training method according to claim 7, further comprising:

acquiring a second training data set and a third training image representing a scene in the second environment, the second training data including a second training image representing a scene in the first environment and second class information indicating a class of each of a plurality of image regions included in the second training image, and wherein the training of the image conversion model includes:

inputting a second output image obtained by inputting the second training image to the image conversion model is input to the discrimination model, and calculating a second loss using the discrimination data output from the discrimination model and the second class information;

inputting the third training image to the discrimination model, and calculating a third loss using the discrimination data output from the discrimination model; and updating a parameter of the discrimination model using the second loss and the third loss.

13. A non-transitory computer-readable medium that stores a program that causes a computer to execute:

acquiring a first training data set including a first training image representing a scene in a first environment and first class information indicating a class of each of a plurality of image regions included in the first training image; and executing training of an image conversion model using the first training data set, the image conversion model being trained to output an image representing a scene in a second environment in response to an input of the image representing the scene in the first environment, wherein the training of the image conversion model includes:

inputting the first training image to the image conversion model;

inputting a first output image output from the image conversion model to a discrimination model;

calculating a first loss using the discrimination data output from the discrimination model and the first class information; and updating a parameter of the image conversion model using the first loss, and wherein the discrimination data indicates, for each of a plurality of partial regions included in the image input to the discrimination model; whether or not the partial region is a fake image region; and a class of the partial region when the partial region is not a fake image region.

14. The computer-readable medium according to claim 13, wherein the first loss is smaller as there are more image regions whose classes indicated by the discrimination data match the classes indicated by the first class information.

15. The computer-readable medium according to claim 14, wherein in the training execution step, the first loss is calculated by giving a larger weight to image regions belonging to a specific class than to image regions not belonging to the specific class.

16. The computer-readable medium according to claim 13, wherein the image conversion model includes a feature extraction model that extracts a feature map from an input image, and wherein the training of the image conversion model includes:

inputting the first training image to the image conversion model to acquire the first output image and a first feature map from the image conversion model, the first feature map being a feature map of the first training image;

inputting the first output image to the feature extraction model to acquire a second feature map from the feature extraction model, the second feature map being a feature map of the first output image, and updating the parameter of the image conversion model using both a feature loss calculated using the first feature map and the second feature map and the first loss.

17. The computer-readable medium according to claim 16, wherein the training of the image conversion model includes:

generating one or more patch sets each of which is a set of a first positive example patch, a first negative example patch, and a second positive example patch, the first positive example patch and the first negative example patch being partial regions of the first training image, the second positive example patch being a partial region at a position corresponding to the first positive example patch in the first output image are generated; and extracting features corresponding to each of the first positive example patch and the first negative example patch from the first feature map, extracting features corresponding to the second positive example patch from the second feature map, and calculating the feature loss using each of the extracted features, and wherein the training of the image conversion model includes:

extracting, in the generation of the patch sets, the first positive example patch intensively from a specific region belonging to a specific class among regions included in the first training image, or calculating the feature loss such that an influence of a loss calculated for the patch set including the first positive example patch extracted from the specific region is larger than an influence of a loss calculated for the patch set including the first positive example patch extracted from outside of the specific region.

18. The computer-readable medium according to claim 13, wherein the program causes the computer to further execute acquiring a second training data set and a third training image representing a scene in the second environment, the second training data including a second training image representing a scene in the first environment and second class information indicating a class of each of a plurality of image regions included in the second training image, and wherein the training of the image conversion model includes:

inputting a second output image obtained by inputting the second training image to the image conversion model to the discrimination model, and calculating a second loss using the discrimination data output from the discrimination model and the second class information;

inputting the third training image to the discrimination model, and calculating a third loss using the discrimination data output from the discrimination model; and updating a parameter of the discrimination model using the second loss and the third loss.

* * * * *